United States Patent
Miyake et al.

(10) Patent No.: US 6,174,039 B1
(45) Date of Patent: *Jan. 16, 2001

(54) RECORDING APPARATUS AND RECORDING METHOD

(75) Inventors: Hiroyuki Miyake; Kazuyoshi Takahashi, both of Kawasaki (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/774,891

(22) Filed: Dec. 27, 1996

Related U.S. Application Data

(63) Continuation of application No. 08/390,289, filed on Feb. 15, 1995, now abandoned, which is a continuation of application No. 08/050,628, filed on Apr. 22, 1993, now abandoned.

(30) Foreign Application Priority Data

Apr. 27, 1992 (JP) .................................................. 4-107679
Apr. 6, 1993 (JP) .................................................. 5-079582

(51) Int. Cl.[7] .................................................. B41J 29/38
(52) U.S. Cl. .............................. 347/12; 347/19; 347/41; 347/106
(58) Field of Search ................................. 347/2, 3, 9, 12, 347/13, 14, 15, 19, 23, 41, 105, 106, 5; 8/445, 499

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,436,439 * | 3/1984 | Koto | 347/87 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,723,129 | 2/1988 | Endo et al. | 347/56 |
| 4,725,849 * | 2/1988 | Koike et al. | 347/105 |
| 4,740,796 | 4/1988 | Endo et al. | 347/56 |
| 4,963,882 | 10/1990 | Hickman | 347/41 |
| 4,967,203 | 10/1990 | Doan et al. | 347/41 |
| 5,121,131 * | 6/1992 | Bouldin et al. | 347/2 |
| 5,124,720 * | 6/1992 | Schantz | 347/12 |
| 5,132,710 * | 7/1992 | Ejiri et al. | 347/3 |
| 5,398,053 * | 3/1995 | Hirosawa et al. | 347/19 X |
| 6,036,300 | 3/2000 | Suzuki et al. | 347/41 |

FOREIGN PATENT DOCUMENTS

| | | | |
|---|---|---|---|
| 0046118 | 2/1982 | (EP) . | |
| 0443832 | 8/1991 | (EP) . | |
| 54-056847 | 5/1979 | (JP) . | |
| 59-123670 | 7/1984 | (JP) . | |
| 59-138461 | 8/1984 | (JP) . | |
| 60-071260 | 4/1985 | (JP) . | |
| 60-104335 * | 6/1985 | (JP) . | 347/44 |
| 60-201965 | 10/1985 | (JP) . | |
| 61-123545 | 6/1986 | (JP) . | |
| 62-053492 | 3/1987 | (JP) . | |
| 1-310965 * | 12/1989 | (JP) . | 347/19 |
| 2-53976 * | 2/1990 | (JP) . | |
| 2-68372 | 3/1990 | (JP) . | |
| 2-192957 | 7/1990 | (JP) . | |
| 3-28727 * | 2/1991 | (JP) . | |
| 3-046589 | 7/1991 | (JP) . | |

* cited by examiner

*Primary Examiner*—N. Le
*Assistant Examiner*—K. Feggins
(74) *Attorney, Agent, or Firm*—Fitzpatrick, Cella, Harper & Scinto

(57) ABSTRACT

A predetermined pattern is printed on a recording sheet 9 for monitoring by using a recording head, and read by a reading device 11 so that abnormal recording elements are detected. Thus, a non-defective image is obtained in such a way that based on this detection result, image data to be supplied to the abnormal recording element is moved to image data of other recording elements to complement the recording. Despite the occurrence of abnormal recording elements, a desired non-defective image can be obtained.

27 Claims, 20 Drawing Sheets

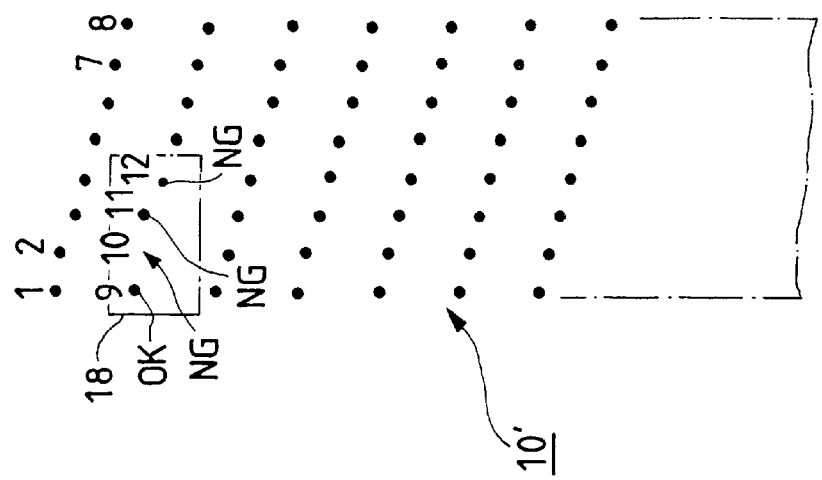
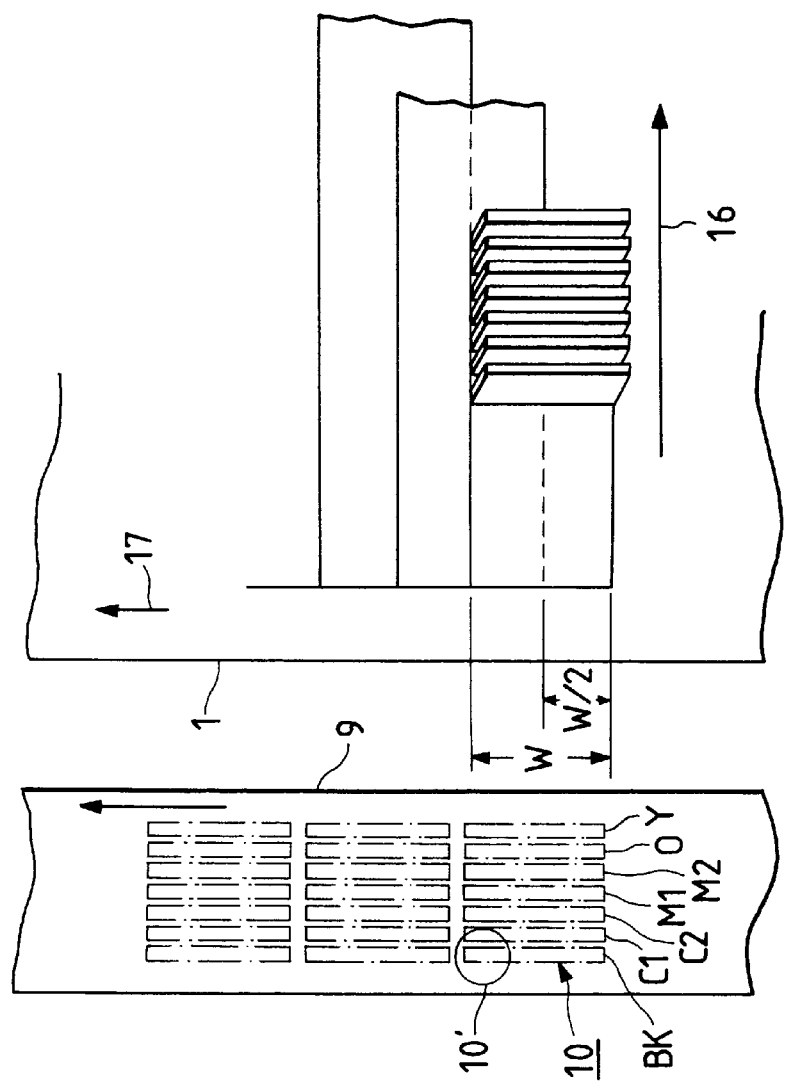

(a) + (b)
PRINTED IMAGE

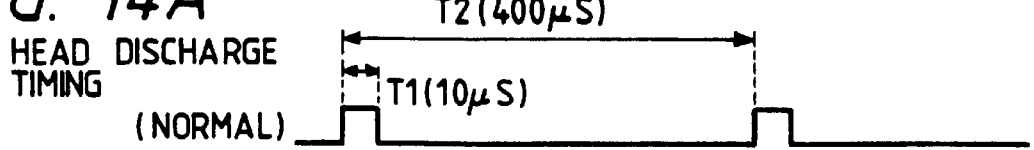
FIG. 14A HEAD DISCHARGE TIMING (NORMAL)
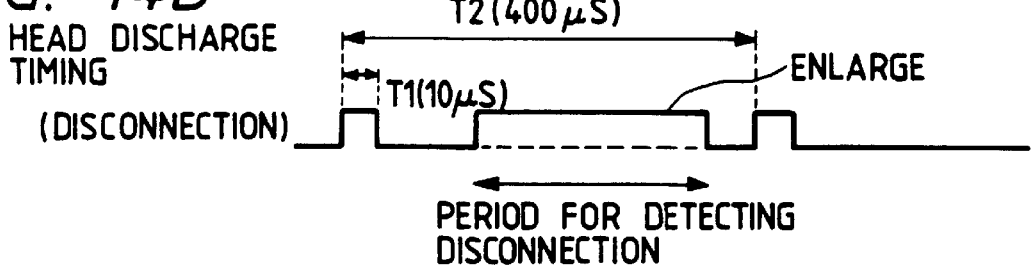
FIG. 14B HEAD DISCHARGE TIMING (DISCONNECTION)
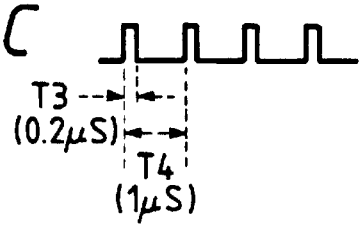
FIG. 14C
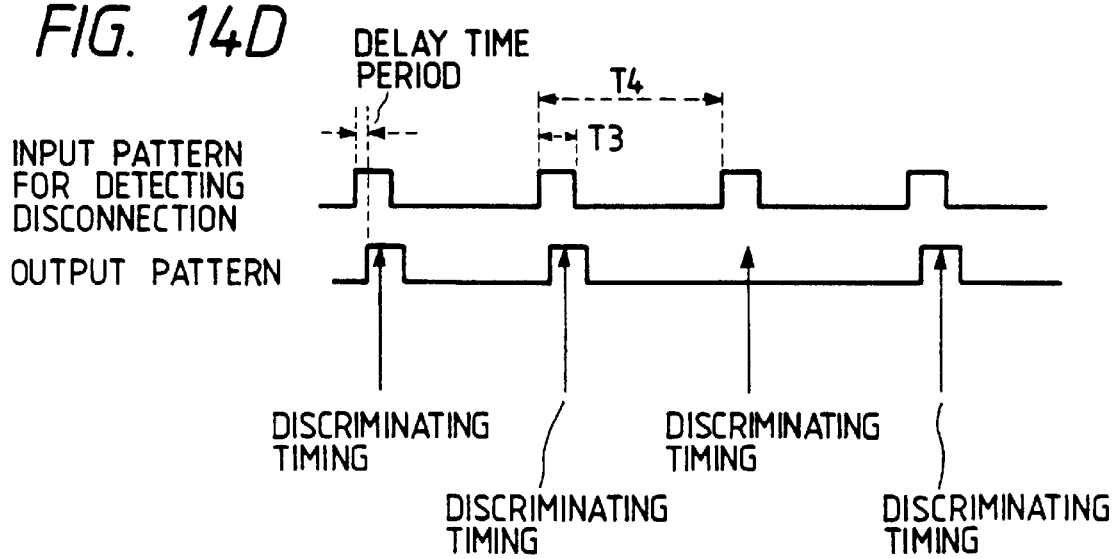
FIG. 14D

RECORDING APPARATUS AND
RECORDING METHOD

This application is a continuation of application Ser. No. 08/390,289 filed Feb. 15, 1995, now abandoned, which is a continuation of application Ser. No. 08/050,628 filed Apr. 22, 1993, abandoned.

BACKGROUND OF THE INVENTION

1. Field of the Invention

The present invention relates to a recording apparatus for forming an image in accordance with an image signal or an original image, and particularly to an ink jet recording apparatus and a recording method.

2. Related Background Art

Conventionally, recording apparatuses using a variety of image forming means have been practically used. Among them, an ink jet recording apparatus in particular has gained wide acceptance because it is favorable in the respects of constitution and running costs. The ink jet recording apparatus performs the dot recording by discharging ink droplets through the nozzles of a recording head onto a recording medium. Exemplary of this recording apparatus is a constitution in which a recording head having a row of nozzles with a predetermined width is sequentially scanned for recording in the longitudinal and horizontal directions relative to the recording medium.

The ink jet recording method forms an image by jetting ink droplets directly onto the recording medium in the above way. Unlike the electrophotographic recording method, it has a feature of being able to form an intended image stably because of its smaller number of processes to form the image.

However, there is some instability with the recording of discharging fine ink droplets through the minute nozzles, for example, non-discharge caused by the clogging of ink discharge orifice in the nozzle with contaminants, dusts or thickened ink, mon-discharge caused by the disconnection of the heater for heating the ink in the nozzle, non-discharge caused by ink droplets enclosing capriciously ink discharge orifice of the nozzle, etc., so that white streaks are likely to occur along the main scan (serial scan) direction, whereby there is a risk that a non-defective image can not be produced.

With such a problem, when the number of nozzles is increased up to several hundreds or thousands to speed up the recording, the probability of occurrence of an abnormal nozzle will increase proportionally thereto, and in the current state of the art, the non-defective image is difficult to obtain.

From the standpoint of fabrication of the recording head, it is conventionally requisite that all the nozzles be normal in non-defective heads in order to obtain the non-defective image. But if the number of nozzles is increased up to several hundreds or thousands, the probability of occurrence of defects during fabrication will increase in proportion thereto, resulting in decreased yield of fabrication, whereby it was difficult to manufacture economically in the practicable basis.

Also, even if the non-defective recording head is fabricated, the whole of the recording head will fail in service when one nozzle causes a trouble during use. Hence, there was a problem that if an abnormal nozzle occurs with a recording apparatus having six to eight multi-nozzles, defective printed matter may be produced every time of printing, whereby it is necessary to stop the apparatus to exchange the recording head.

To cope with such problem, it is conceived as a measure that the prevention against the clogging of nozzles is made, a recovery device for effecting the recovery is activated if a nozzle clogging is detected visually, or a recovery operation is incorporated into the print sequence, supposing that the clogging of nozzles may occur.

Also, one solution has been proposed that when the clogging of nozzles occurs during the printing, the overprint is made on the defective part of the image to reduce the influence of clogging (see for example U.S. Pat. No. 4,963, 882 and U.S. Pat. No. 4,967,203).

However, with such a solution taken, the probability of occurrence of the clogging of nozzles will decrease, but is not totally reduced to zero, or further no measure has been made in the state of the art against irreversible undischarge, which will occur when contaminants passing through the ink filter at a certain probability may accumulate to clog some nozzles, or when the disconnection of discharge heater for heating the ink happens accidentally or due to the expiration of its span of life.

Also, by executing the recovery operation with a method as disclosed in the above-described U.S. patents, white streaks may be relieved to some extent, but not completely eliminated, whereby it is difficult to say that all the problems have been resolved.

On the other hand, with an image processing technique such as an error diffusion method, and further in a combination with a multi-valued print technique (which adjusts the size of a dot by forming one pixel with the overprint of a few ink droplets of smaller size and depending on the multiplicity of prints), the gradient representation is allowed, and further the provision of some specific color print heads beyond conventional four colors is easy, whereby the multi-color print such as the printing with six to ten colors is possible, with the color reproduction range broadly extended, so that the image representation ability itself with the ink jet print technique has reached a level closer to that of the offset printing.

However, at the practical level, the above problems have not been completely resolved, and the ink jet print technique has not been applied widely although it has many features such as the instant output of computer publishing, no impression creating process, no need of ink mixing, and the wider color reproduction range.

Accordingly, the requirements of offering the non-defective printed matter along with the productivity (speed, continuous operation) and profitability having industrial meanings to the ink jet print technique Rowe not been realized with any of the conventional techniques.

SUMMARY OF THE INVENTION

The present invention is devised in view of the aforementioned problems, and its object is to provide a recording apparatus which is capable of providing a desired image without image defects even when a trouble of causing an image failure occurs in a recording element of a recording head.

It is another object of the present invention to provide a recording apparatus characterized by comprising:

main scan means for scanning recording means having a recording element row consisting of a plurality of recording elements for applying the ink onto a recording medium in a different direction from that of said recording element row, relatively to the recording medium, sub-scanning means for sub-scanning said recording means and said recording medium relatively in a direction of said recording element row by a smaller amount than the total length of said recording element row every time of said main scan, recording control means for subdividing all the recording elements of said recording element row in the direction of said recording element row into a plurality of blocks, and scanning different blocks in the same region of the recording medium by multiple times to record on the same region of the recording medium with recording elements in different blocks every time of different main scan, image data supply means for subdividing a predetermined image data into pieces of image data in a complemental relation to each other, and supplying said piece of image data subdivided to said subdivided direction block in each main scan to thereby record said predetermined image data with recording elements in different blocks, detection means for detecting abnormal recording elements of said recording means, and image data moving means for removing image data corresponding to an abnormal recording element detected by said detection means from a piece of image data to be supplied to a block to which said abnormal recording element belongs, and moving said abnormal image data to another piece of image data to be supplied to another block for recording on the same region of the recording medium to superimpose said image data thereon.

Note that in this specification "print" includes "textile printing" or "recording", and means that the image is applied on the print medium in a wider sense without limiting the objective of print.

Also, examples of the print medium include cloths, wall papers, wall cloths, papers, OHP films, and so on. Herein, the cloths include all kinds of woven or unwoven fabrics and other knits, without regard to materials, or how to weave or knit.

Also, the wall papers include wall pasting members made of paper, cloth, or synthetic resin sheet.

In accordance with a constitution of the present invention, the non-defective image can be obtained in such a way that a predetermined pattern is printed on a recording sheet for monitoring by the recording head, and this pattern is read by a reading device to detect abnormal recording elements. Based on this result, image data to be applied to abnormal recording elements is moved to image data for other recording elements to be superimposed thereon and complement the recording at different main scans.

BRIEF DESCRIPTION OF THE DRAWINGS

FIG. 4 is a view for explaining a check pattern.

FIG. 5 is an enlarged view of a part of check pattern.

FIGS. 14A to 14D are explanation diagrams for the timings of detecting the disconnection.

DETAILED DESCRIPTION OF THE PREFERRED EMBODIMENTS

The preferred embodiments of the present invention will be described below in detail with reference to the drawings.

Figure 1:
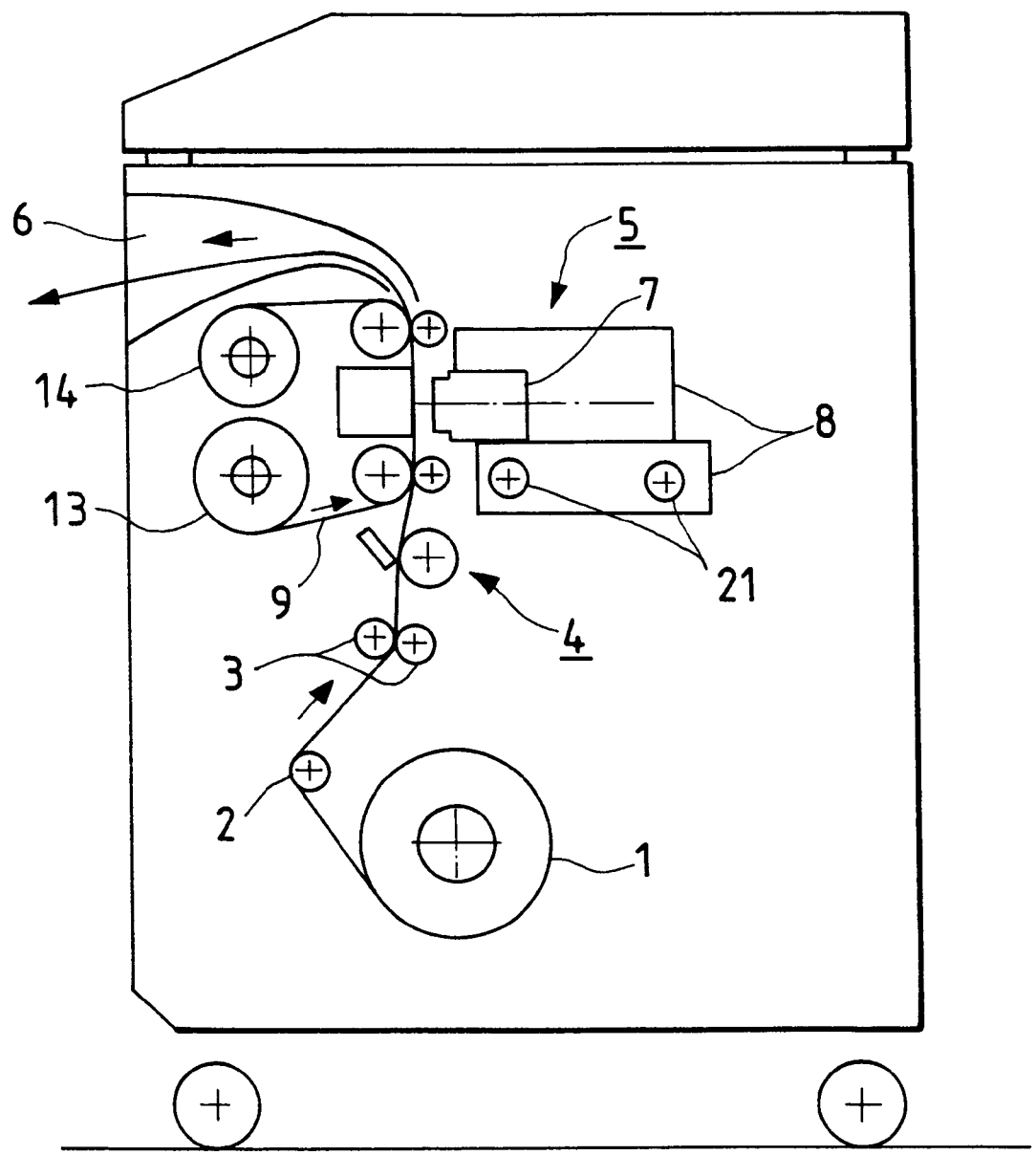
FIG. 1 is a cross-sectional view of a recording apparatus according to the present invention.

FIG. 1 is a cross-sectional view of a recording apparatus according to the present invention, wherein 1 is a lengthy roll as the recording medium, 4 is a cutter for cutting the recording sheet 1 at a necessary length as appropriate, 2 is a guide roller for guiding the recording sheet in a conveyance direction, and 3 is a feed roller for conveying the recording sheet in the conveyance direction, whereby the recording sheet 1 is fed via the guide roller 2 and the feed roller 3 to a recording unit 5.

Reference numeral 8 is a carriage for carrying a row of recording heads 7 as will be described later, which is movably carried in a vertical direction in the figure (or essentially a horizontal direction in the recording apparatus) by a pair of main scan rails 21. The recording sheet 1 recorded at the recording unit 5 is exhausted out of a sheet exhaust opening 6.

Figure 2:
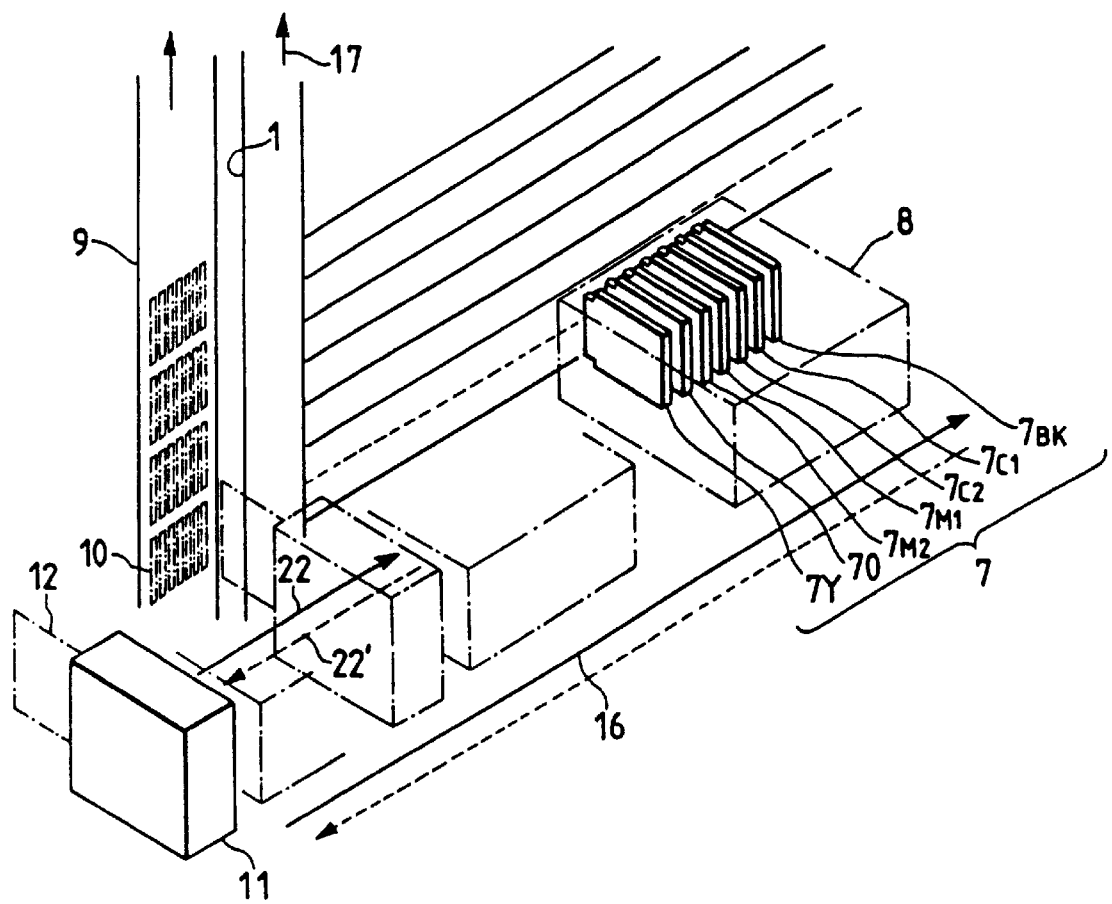
FIG. 2 is a perspective view for explaining a recording unit.

Referring now to FIG. 2, the recording unit 5 will be described below.

The row of recording heads 7 is comprised of seven recording heads in total, i.e., a recording head 7Bk for printing black, a recording head 7C1 for printing cyan, a recording head 7C2 for printing cyan-type special color, a recording head 7M1 for printing magenta, a recording head 7M2 for printing magenta-type special color, a recording head 7O for printing orange-type special color, and a recording head 7Y for printing yellow, whereby it is possible to provide an extended color reproduction range which could not be obtained with the conventional mixing of four colors. This row of recording heads 7 is mounted on the carriage 8 which is linearly guided by the main scan rail 21.

This row of recording heads 7 moves (scans) to the rightmost end while printing from left to right in a direction of an arrow 16 in FIG. 2, and then returns to the leftmost end. After the printing of one line is terminated, the recording medium 1 is conveyed by half of a print width of the recording head in a sub-scan direction of an arrow 17 to prepare for the printing of next line.

Figure 3:
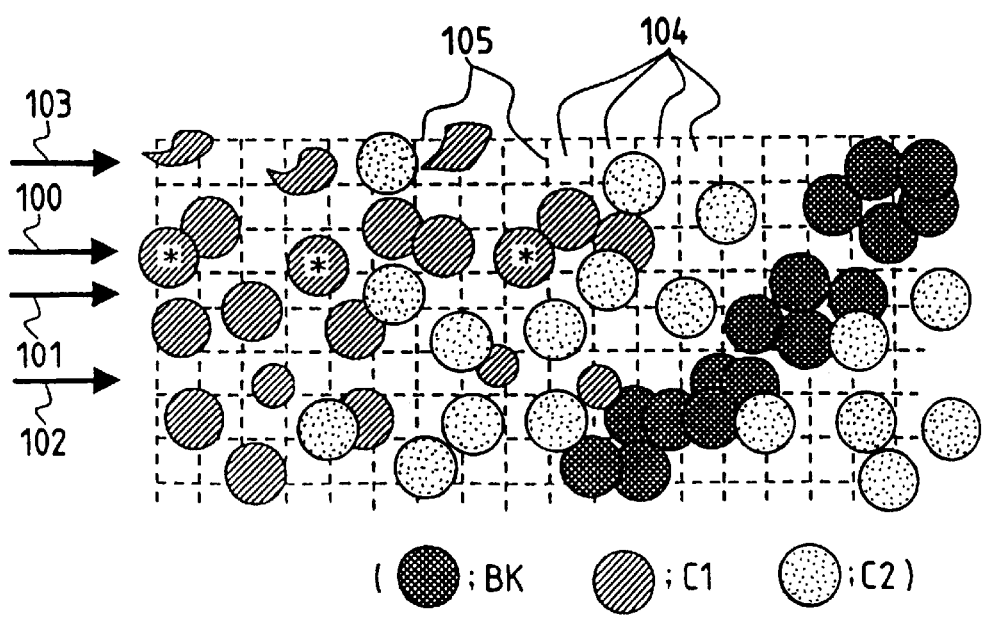
FIG. 3 is an enlarged view of an actual print example.

FIG. 3 shows an actual print example in enlarged scale. A portion 104 of box partitioned by a lattice 105 indicates a pixel which is an area to be printed.

The size of the lattice is as large as 63.5 $\mu$m×63.5 $\mu$m with a resolution of 400 dpi, and the diameter of a dot to be printed is designed to be larger than one side of the lattice (about $\phi$100 $\mu$m) so that no spacing is provided therebetween to paste the dots when they are arranged in all pixels.

Also, the actual print position does not necessarily coincide with its exact position as shown in FIG. 3, due to some fluctuation, resulting in some dispersion of dot size and shape.

In FIG. 3, the line as indicated by an arrow 100 reveals that the black recording head 7Bk is undischarged, and the line as indicated by an arrow 101 reveals that dots of the cyan recording head 7C1 are "deviated", wherein the dots as indicated by the sign * must essentially lie on this line. The line as indicated by an arrow 102 reveals that the dot diameter with the cyan recording head 7C1 is abnormally small. The line as indicated by an arrow 103 reveals that the shape of dot with the cyan recording head 7C1 is abnormal.

As will be clear from FIG. 3, the separation and identification between adjacent dots which are printed fluctuating, or similar dots with the special color recording head 7C2 are impossible, in which it is difficult to determine whether or not the nozzles are normal from actually printed dots. Particularly, in the color mixed portion with high print duty, the ink may mingle with each other on the recording medium, thereby making it difficult to separately detect the dots. Further, in the type of printing with the dot diameter adjusted (multi-value printing method), a plurality of dots may be printed on the same position, which makes the discrimination more difficult. In order to detect the state of print nozzles at good precision, there is provided a detection device for detecting the situation of the recording head in the present invention.

In FIG. 2, on the left-side of the recording medium, a nozzle trouble detecting sheet 9 is supplied in the same plane as the recording medium 1, on which a check pattern 10, or a test image for checking to see the discharge condition of the recording head (whether or where any abnormal nozzle exists), is printed prior to printing of each line.

A check pattern 10 corresponds to the recording head of each color as shown in FIG. 4. A part 10' thereof is shown in detail in FIG. 5. The numerals 1, 2, 7, 8, 9, 10, in the figure indicate the nozzle number which has printed the dot. Print dots from each nozzle are printed dispersively and optically read (the nozzles with numbers 10, 11 and 12 are abnormal in this figure).

This pattern is read by an optical reading device 11 provided with a CCD inline sensor as shown in FIG. 2 reciprocating in the directions as indicated by the arrows 22, 22', with the CCD inline sensor scanning on its optical path 12.

The movement of the recording unit as viewed from above is shown in FIGS. 6A, 6B, 6C and 6D. Note that in these figures, the number of recording heads is three for convenience and simplification of the figures.

Figure 6A:
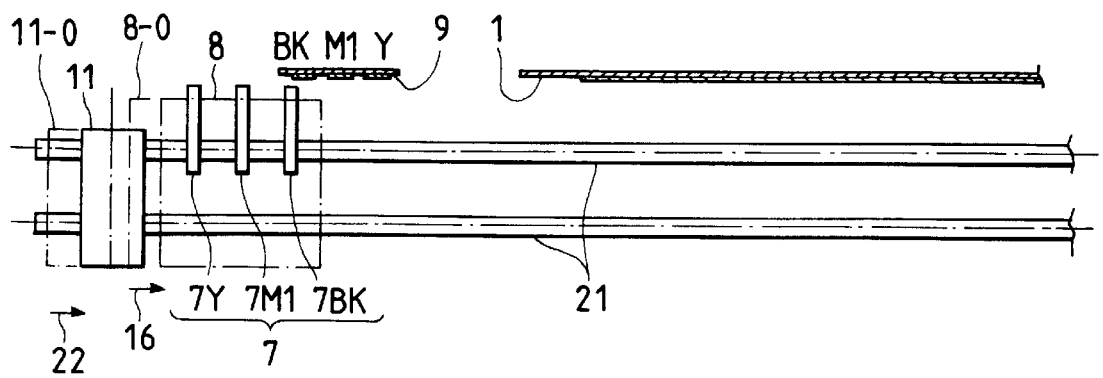
FIGS. 6A to 6D are views for explaining the state of the carriage movement as viewed from above.

In FIG. 6A, the recording unit 11 is guided on the main scan rails 21, along with the carriage 8, with the driving and the control being carried out by another motor (not shown).

FIG. 6A is a view in which the reading unit 11 and the carriage 8 have started to move concurrently from the home positions 11-0, 8-0 in the right direction as indicated by the arrows 22, 16 to record a check pattern with the black recording head 7Bk on a detection sheet 9.

Figure 6B:
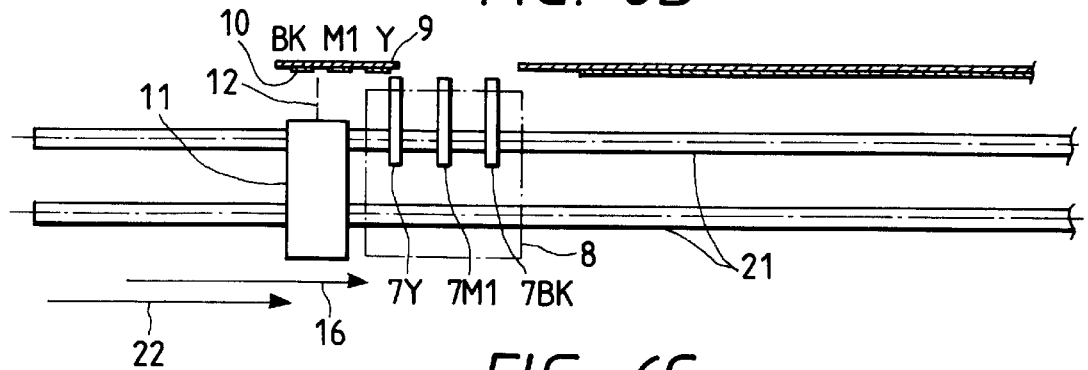

FIG. 6B is a view in which the reading unit 11 and the carriage 8 have further advanced in the direction of the arrows 22, 16, so that the check patterns of all colors have been written, and the reading unit 11 has just read a black (Bk) check pattern 10 on the optical path 12.

Figure 6C:
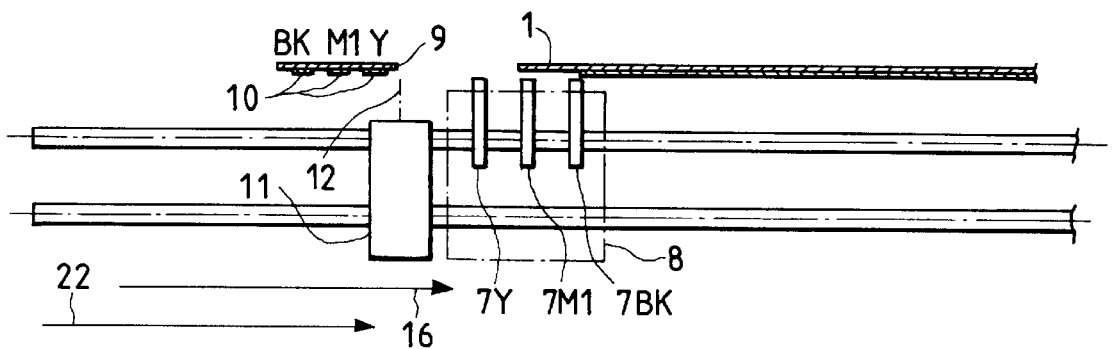

FIG. 6C is a view in which the check patterns of all colors have been read, and the printing with the black recording head 7Bk is about to start.

For the black, abnormal nozzles are judged from read data during the reading operation as shown in FIGS. 6B and 6C to move image data as will be described later. For the other colors, the same processing is also performed during a period from the completion of reading to the start of printing.

Figure 6D:
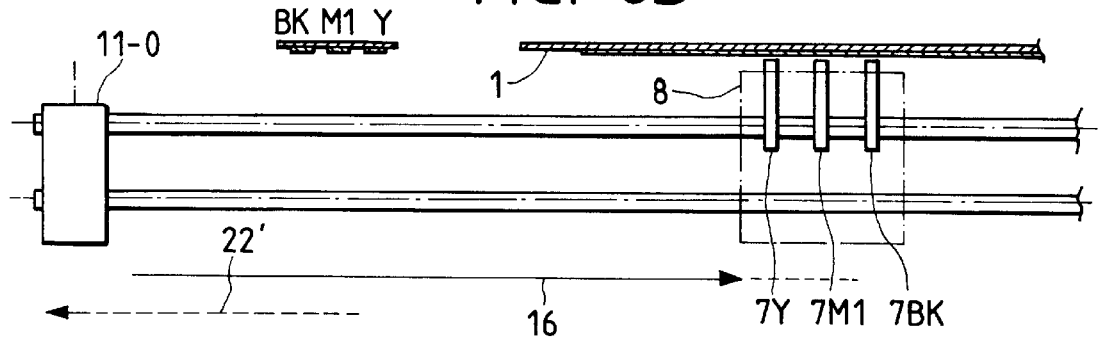

If the reading unit 11 has completed the reading, it returns in a direction of the arrow 22' in FIG. 6D to the home position 11-0 and waits for the carriage 8 to return to its home position 8-0. On the other hand, the carriage 8 continues printing of the line, and returns to the home position 8-0 upon completion of the printing of the line, then transferring to the printing of the next line together with the reading unit 11. In the following, the operation of FIGS. 6A to 6D is repeated.

Figure 7:
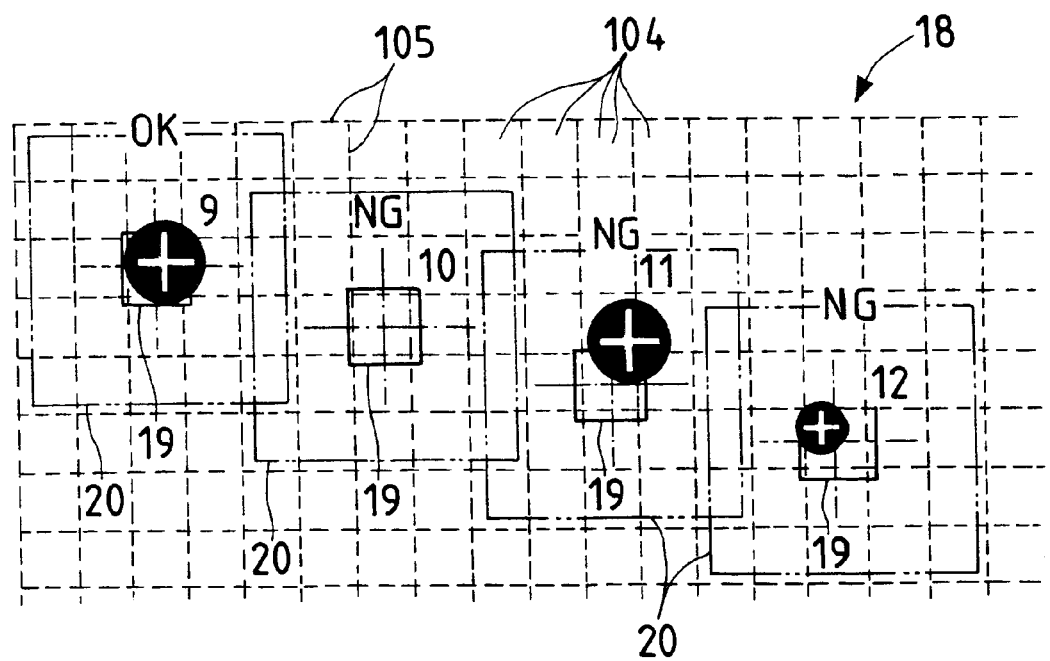
FIG. 7 is a partial enlarged view of the check pattern as shown in FIG. 5.
Figure 9:
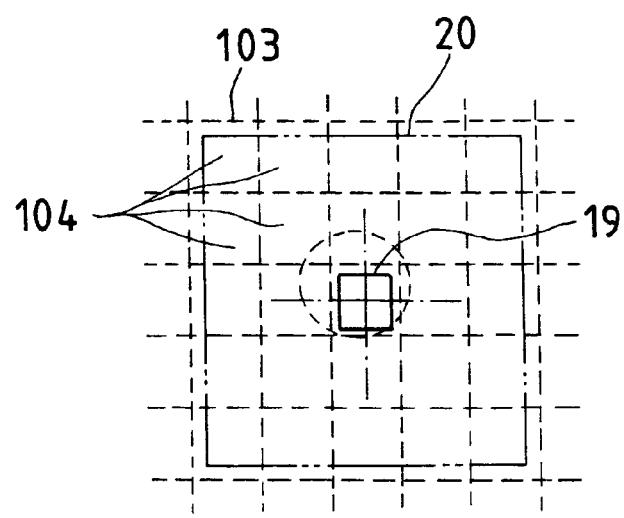
FIG. 9 is a view for explaining a permissible impingement area.

FIG. 7 is an enlarged view showing a part 18 of the check pattern as shown in FIG. 5.

In order to detect separately the situation of each nozzle, the permissible impingement area 19 is allocated in a pixel matrix 104 partitioned by the lattice 105 as shown correspondingly to each nozzle number. Each permissible impingement area is observed in a wider CCD field 20 to enable detection for greatly deviated dots.

The dot from the ninth nozzle is OK, the dot from the tenth nozzle is NG (undischarged), the dot from the eleventh nozzle is NG ("deviated" out of the impingement position), and the dot from the twelfth nozzle in NG (too small dot) so that a trouble is discriminated. Also, a heteromorphic dot or too large dot on the line 103 as indicated in FIG. 3 is discriminated as abnormal.

Herein, the states of nozzles were discriminated each by one dot. There is no problem in determining the non-discharge, but a nozzle not so bad may be discriminated as NG by virtue of some fluctuation in the dot impingement position, or the positional error relative to the grid defined as the ideal pixel position. To avoid this, the permissible impingement area is set to be slightly larger (permissible impingement area 19 in FIG. 17), but "deviation" may be more tolerated, which is undesirable in respect of high image quality.

On the contrary, a dot of NG on the average may be printed even though only one dot is OK on the trouble detection pattern, in which case the higher image quality is impeded.

Figure 8:
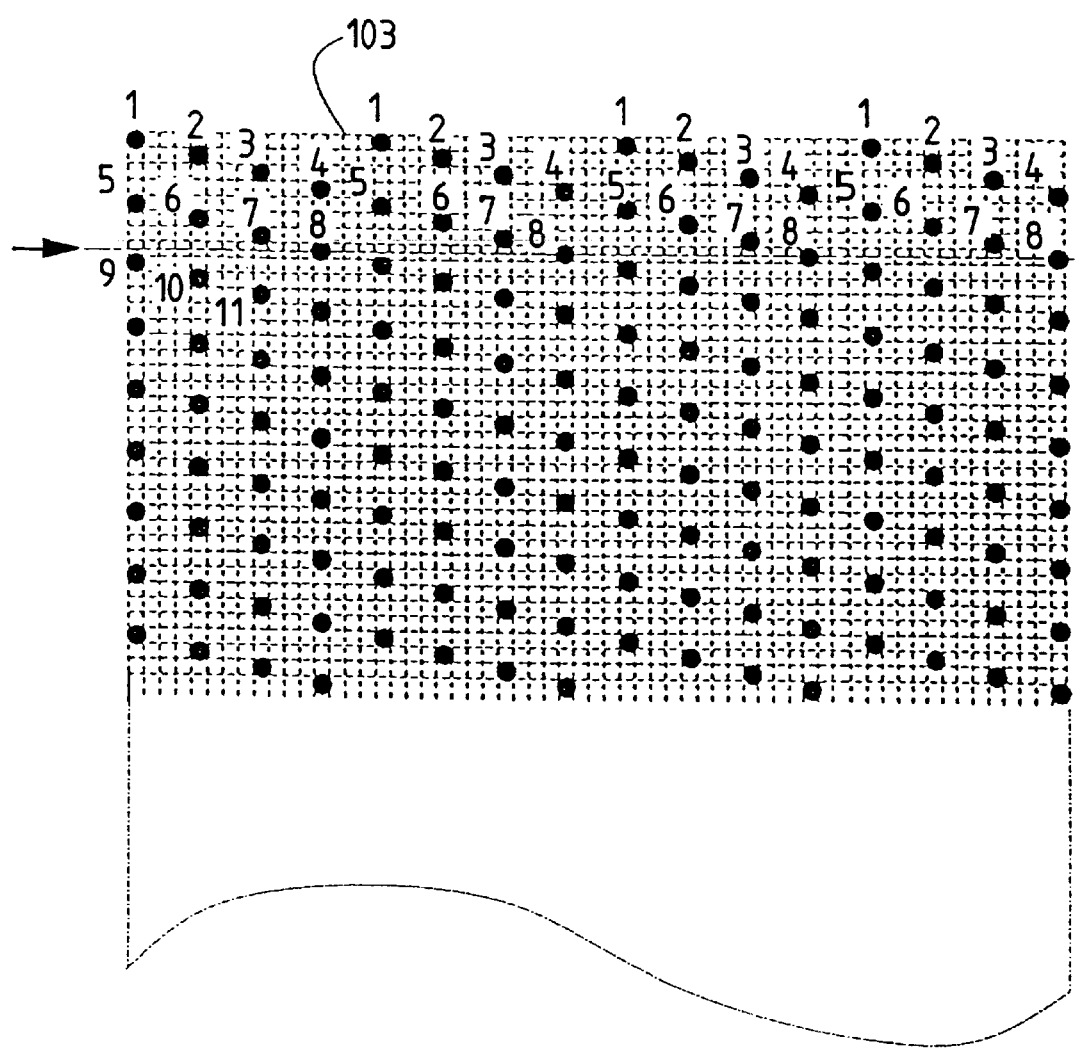
FIG. 8 is a view for explaining an improved reading/discriminating method.

FIG. 8 shows an improved reading/discriminating method.

In FIG. 8, the average impingement position and dot size are obtained based on the measurements of plural dots from the same nozzle (four dots for each nozzle; for example, four dots as indicated by the arrow for the eighth nozzle). And the relative position is adjusted by calculation so that the error between the average position from all the dots and the ideal pixel position for the grid 103 may be minimum, thereby making the discrimination.

The "deviation", the dot size, and the shape are determined from the average values, and the non-discharge is discriminated depending on whether or not there is at least one undischarged dot among four dots.

Herein, since the "deviation", the dot size and the shape are based on the average values, the permissible area can be rendered narrower, whereby for "deviation" the high precision is allowed in the permissible impingement area 19, and for non-discharge the securer discrimination can be made.

The trouble detection sheet 9 as shown in FIGS. 2 and 4 is driven separately from the recording medium 1. And the trouble detection sheet 9 is fed intermittently from a roll 13 to a winding roll 14 at a slightly larger pitch than a print width of one line so that the detection pattern may not overlap.

On the other hand, the recording medium 1 is sub-scanned in a direction of the arrow 17 precisely at a pitch of one-half of a print width w, as shown in FIG. 4, so that each line is overlapped precisely by one-half in printing.

In the following, how to complement the data of nozzle as discriminating NG will be described with regard to handling the recording head of a certain one color and its image data.

Figure 10A:
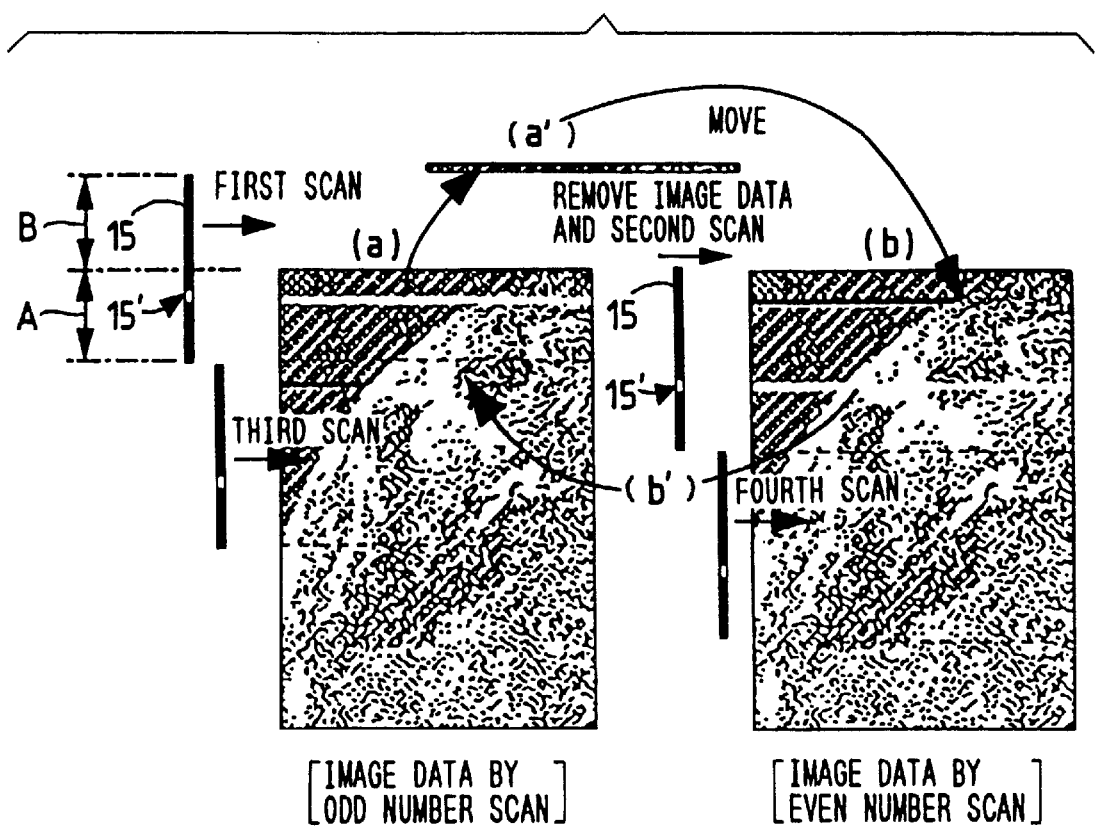
FIGS. 10A and 10B are views for explaining a complement example-1.
Figure 10B:

Complement Example-1: FIGS. 10A and 10B

The image data is divided into a piece of image data (a) to be printed by odd number scan (main scan) and a piece of image data (b) to be printed by even number scan, as shown in FIG. 10A.

There are several dividing methods, but most of them are accomplished by dividing all the image data into pieces of image data having half the density, so that image data (a) and (b) superimposed can produce exactly the complete image data.

Herein, image data (a) and (b) are shown in the figure wherein the entire screen is provided at a time to facilitate the understanding, but it will be understood that image data transmitted serially may be sequentially divided into its scan data.

At the first scan, a part of data corresponding to its scan is printed by the recording head 15 while it is being read out from image data (a). At the second scan, a part of data corresponding to its scan (a position displaced one-half of print width from the print position of the first scan) is printed while it is being read from image data (b). Subsequently, the third scan and the fourth scan are performed, so that the printing is totally accomplished by two overwritings with half the density.

This division feed overwriting can reduce the unevenness of density and the occurrence of overwrite streaks caused by the error of pitch feed.

Herein, it is to be noted that the print head 15 with a number of nozzles arranged integrally in one column may include an abnormal nozzle 15' in part thereof. This abnormal nozzle 15' is discriminated prior to each main scan by the above detecting device.

In this complement example-1, image data (a') corresponding to the abnormal nozzle is removed from the image data (a) and transferred to the image data (b). And at the second scan, such image data (a') is printed in the superposed state. As the nozzle for printing superposed data is normal, the data (a') which may be printed abnormally or missed if no measure is taken can be correctly printed in accordance with the data.

Also, at this second scan, the abnormal nozzle 15' remains uncorrected, but is detected by making the trouble detection to be performed prior to the second scan (main scan), whereby the data (b') corresponding to such abnormal nozzle is likewise removed from image data (b) and transferred to the image data (a) to make the superposition.

While data (a') and (b') with the abnormal nozzle are directly transferred to the image data (b) and (a), respectively, it will be appreciated that data may be stored in a dedicated memory separately provided, and retrieved at the printing to make the superposition.

When the "trouble" is non-discharge, it is preferable that the data (a') and (b') are not left in the original image data so as not to be printed, but they should be removed therefrom. This is due to the fact that the non-discharge nozzle may be recovered capriciously, resulting in a risk that unexpected print may be conducted and the intended complement may be disordered.

When the recovery from trouble is detected at the trouble detection prior to a certain scan (main scan), the above-described complement operation is stopped in accordance with the data.

In the above way, the missing/distortion of data with the abnormal nozzle can be complemented, because a print portion by the former half portion (leading print block A) of the recording head is again overprinted by the latter half portion (trailing print block B) of the recording head. Thus, image data of the leading print block A and image data of the trailing print block B are in a complemental relation to each other in which image data of one line is divided.

As above described, the complement is performed if any abnormal nozzles occur in the leading print block A. It is to be noted that the trouble occurring in the trailing print block B is only reduced in respect of its degree of influence as described in U.S. Pat. No. 4,963,882.

Figure 11:
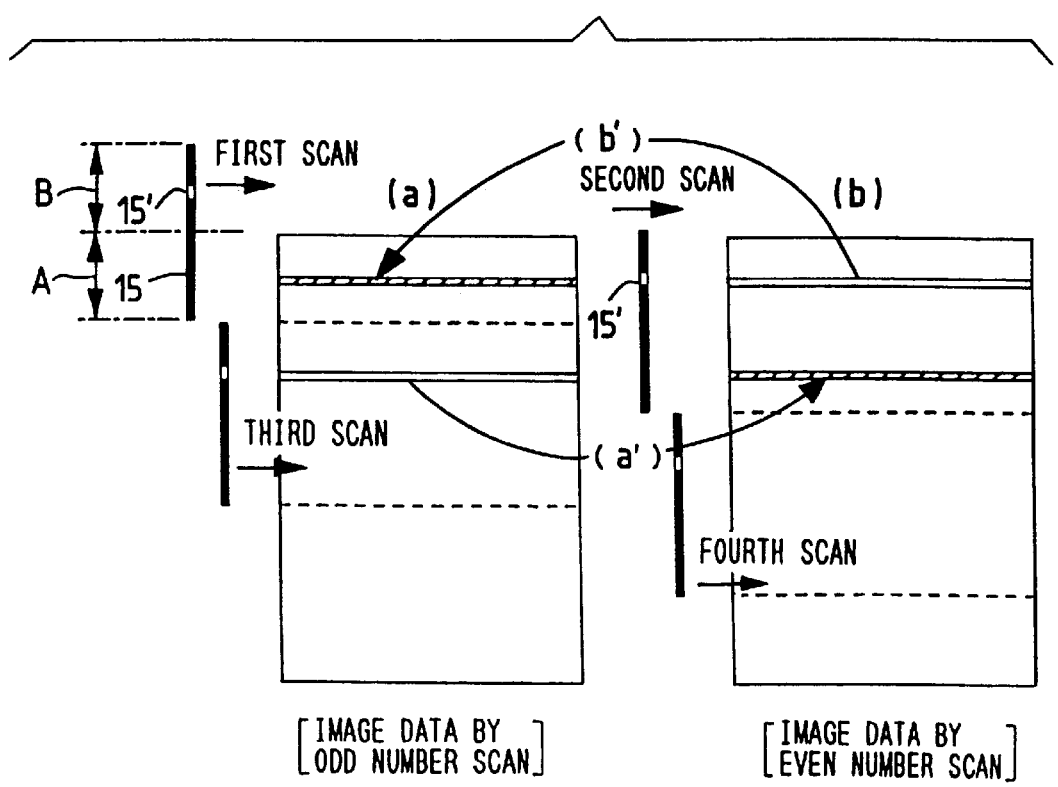
FIG. 11 is a view for explaining a complement example-2.
Figure 12:
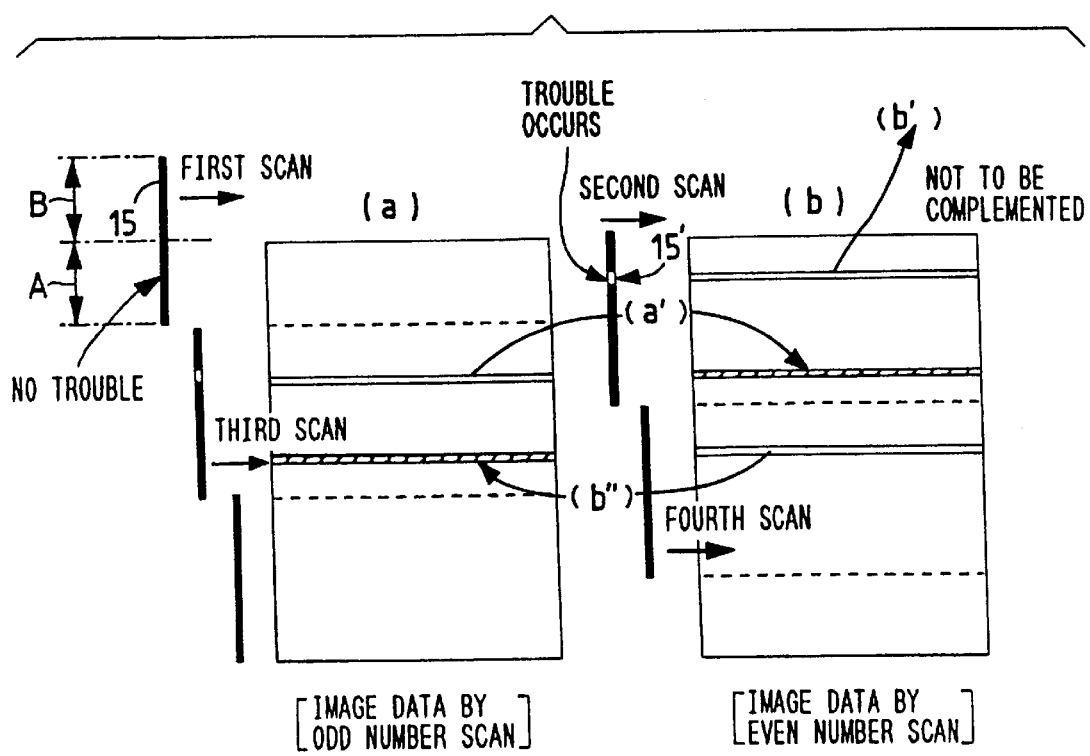
FIG. 12 is a view for explaining a complement example-2.

Complement Example-2: FIGS. 11 and 12

The abnormal nozzles occurring in the trailing print block can be also dealt with. A complement example-2 which is developed from th e complement example-1 will be presented below with reference to FIGS. 11 and 12.

An abnormal nozzle 15' in the trailing print block B is discriminated in the trouble detection prior to the main scan of printing. Because this abnormal nozzle will cause a trouble at the second scan to be performed next, a part of data (b') corresponding to this is cut out beforehand from data (b) and transferred to data (a), whereby the first scan is performed with this superimposed data.

Likewise, if that nozzle is still abnormal in the trouble detection prior to the second scan, a part of data (a') corresponding thereto at the third scan is transferred to data (b), whereby the second scan is performed with its superimposed data.

In this way, the complement can be performed wherever the abnormal nozzle exists. However, when there is no trouble initially and an abnormal nozzle occurs in mid course (a certain scan), as shown in FIG. 12, on the trailing print block, data (b') of the first line after the occurrence of trouble can not be complemented, resulting in the degree of influence for that one line being only reduced.

The printing from the next line can be complemented as shown in FIG. 11. Also, there is no problem even if the trouble is recovered in mid course.

FIG. 12 shows an instance where the trouble disappears at the fourth scan. Data (b") corresponding to the abnormal nozzle in the trouble detection prior to the third scan has been already transferred to image data (a) and printed, with image data (b) containing blank, so that blank part is not printed at the fourth scan, but the printed image is not overlapped or missed.

Thus, in this example-2, the complement can be performed wherever the abnormal nozzle occurs in the recording head.

Note that for the trouble occurring in mid course of printing, there is a great effect in that though the first one line has only the degree of influence reduced, the complete image can be obtained from the next line and beyond.

While the complement examples-1 and -2 were described in the instance of two divisions and two overwritings, it will be appreciated that more divisions and overwritings, for example, three divisions and three overwritings, may be made. In this case, image data is divided into three pieces, whereby data corresponding to the trouble of two leading print blocks are respectively transferred to the next scan data, and data corresponding to the trouble of the trailing print block is transferred to the scan data of the first leading print block in such a manner as shown in FIG. 11.

By increasing the number of overwritings, the multi-value print technique can be applied, so that the higher image quality of printed matter can be accomplished. Also, even if the number of overwritings may be increased for the purpose of higher image quality, the present invention allows for the discrimination for the condition of the recording head at high precision exactly in the same way by means of a dot state detecting device separately provided, with further remarkable effects obtained.

Figure 13:
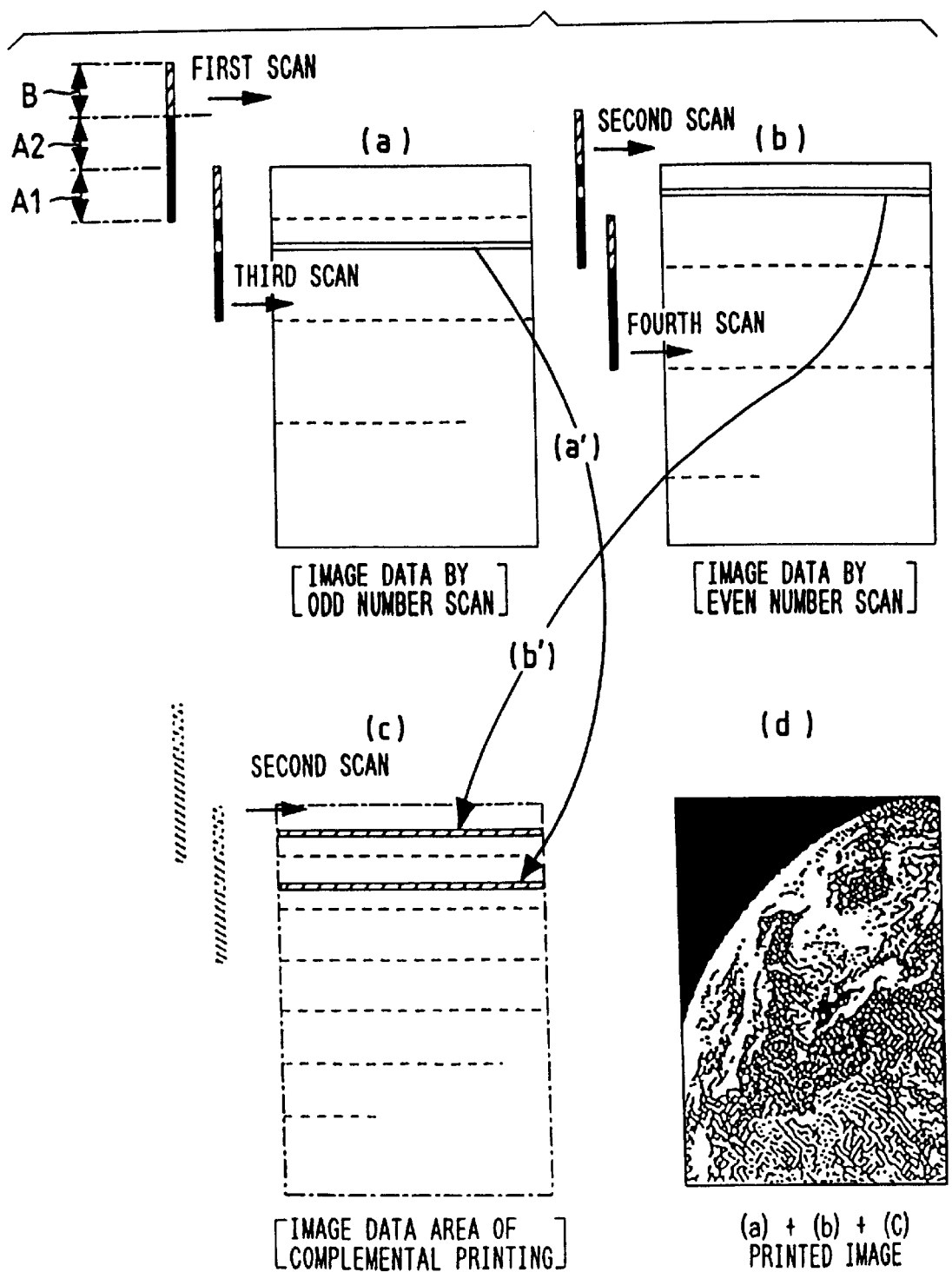
FIG. 13 is a view for explaining a complement example-3.

Complement Example-3: FIG. 13

A further developed complement example-3 which allows for the full complement is shown in FIG. 13.

In this example, the recording head is divided into three blocks, and two overprintings are performed with half of the density (or one-third the density from the viewpoint of the entire recording head), as heretofore described, using two leading print blocks A1, A2. The print data with the abnormal nozzle is sequentially stored in another image data area (c) for complemental print, and when the trailing print block B scans that portion, the data is sequentially read out and printed.

This data area (c) is shown as one full screen for the easier explanation, but in practice it may be of minimum size.

The trailing print block is concentrated on a role as the abnormal (non-discharge) complemental block, bringing up the rear, whereby the full complement print can be fulfilled with a simple constitution.

Complement Example-4

In the heretofore described examples, the detection of abnormal nozzles is performed by optically reading a print pattern, but may be performed along with the detection of disconnection occurring in the discharge heater (which checks for a resistor during the period between each discharge pulse applied in accordance with image data during the printing).

Most of non-discharge phenomena which occur accidentally or due to expiration of the span of life (which may lead to disconnection owing to the abrasion of heater) in the ink jet recording system which discharges the ink by heating are caused by the disconnection of heater.

In the heretofore described examples, the discrimination of abnormal nozzle is performed immediately before the printing, and such an abnormal nozzle, if any, is complemented, but any trouble occurring in mid course of printing (during the printing/scanning of a certain line) is not complemented.

If the heater disconnection detection is performed in unison, it is detected at which position of the line the trouble (non-discharge) has occurred. Accordingly, the above examples-1 to -3 may be applied from that trouble occurring position of the line.

The constitution of disconnection detection will be described below with reference to FIGS. 14A to 15. FIGS. 14A to 14D are diagrams for explaining the timing of disconnection detection, in which FIG. 14A shows the non-discharge timing from the normal recording head, and for a recording head having a discharge frequency of 2.5 kHz, for example, the drive signal of recording head comes at every 400 $\mu$sec of T2. The drive time of heater 31 within the recording head is 10 $\mu$sec of T1.

FIG. 14B is the timing for detecting the disconnection, in which quite short pulses as shown in FIG. 14C are issued during the period when discharge operation is not effected. As shown in FIG. 14C, for a recording head having 256 nozzles, when pulses of 0.2 $\mu$sec are issued sequentially to each one of the nozzles at a frequency of 1 $\mu$sec, the consumption current of the recording head is detected by using a photocoupler 32 as shown in FIG. 15. The detection signal is ideally pulses as shown in FIG. 14C.

Normally, in order to discharge the ink from the recording head, the pulse width of several $\mu$sec is required at minimum, and the pulse width of about 0.2 $\mu$sec as in this example has no effects on the discharge. Next, the detecting operation of disconnection will be described. First, as shown in FIG. 14D, the discharge heater 31 within the recording head is driven in acordance with the input pattern for detecting disconnection, and the consumption current at that time is detected by the photocoupler 32. The waveform for the output pattern is delayed by a slight amount from that of the input pattern because of the delay time period of a circuit system. And at the discriminating timings, as indicated by the arrow, it is detected that the output is provided in accordance with the input pattern. In an instance as shown in FIG. 14D, the third output is not provided, whereby it is found that there is a disconnection.

Figure 15:
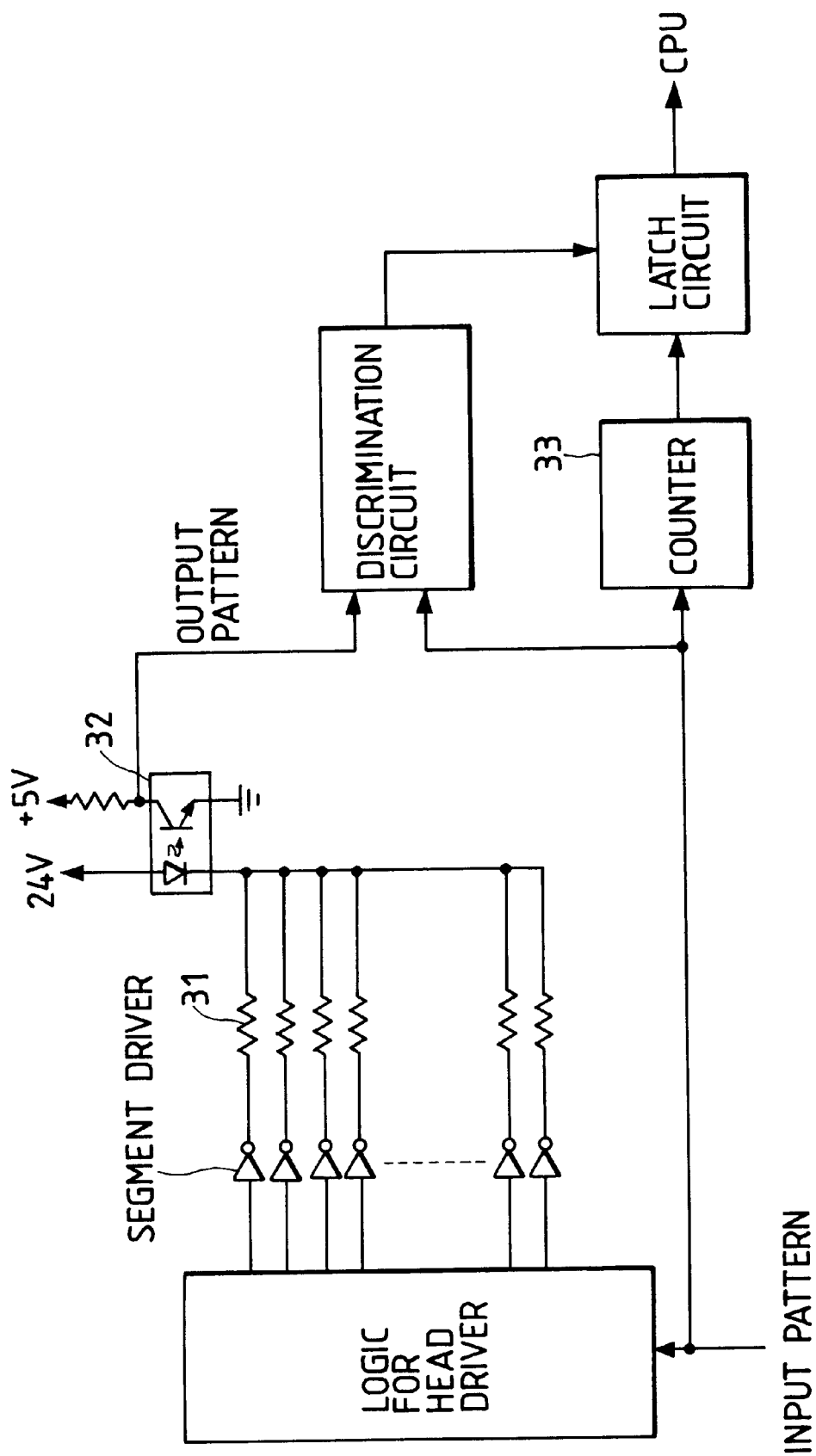
FIG. 15 is a circuit diagram for detecting the disconnection.

As shown in FIG. 15, an input pattern is entered into a counter 33 to monitor the number of nozzle which is being discriminated at present. If a discrimination of NG is made, the value of the counter at that time is latched, and a signal indicating the number of disconnected nozzle can be output to a CPU.

According to this example-4, it is possible to make the complement of the trouble (non-discharge) occurring in mid course of printing.

The operation of the examples 1 to 4 as above described is executed under the control of a control unit (not shown) for controlling the whole recording apparatus. This control unit is composed of a CPU such as a microprocessor, a ROM for storing control programs or a variety of data, and a RAM for use as the work area of CPU.

Figure 16:
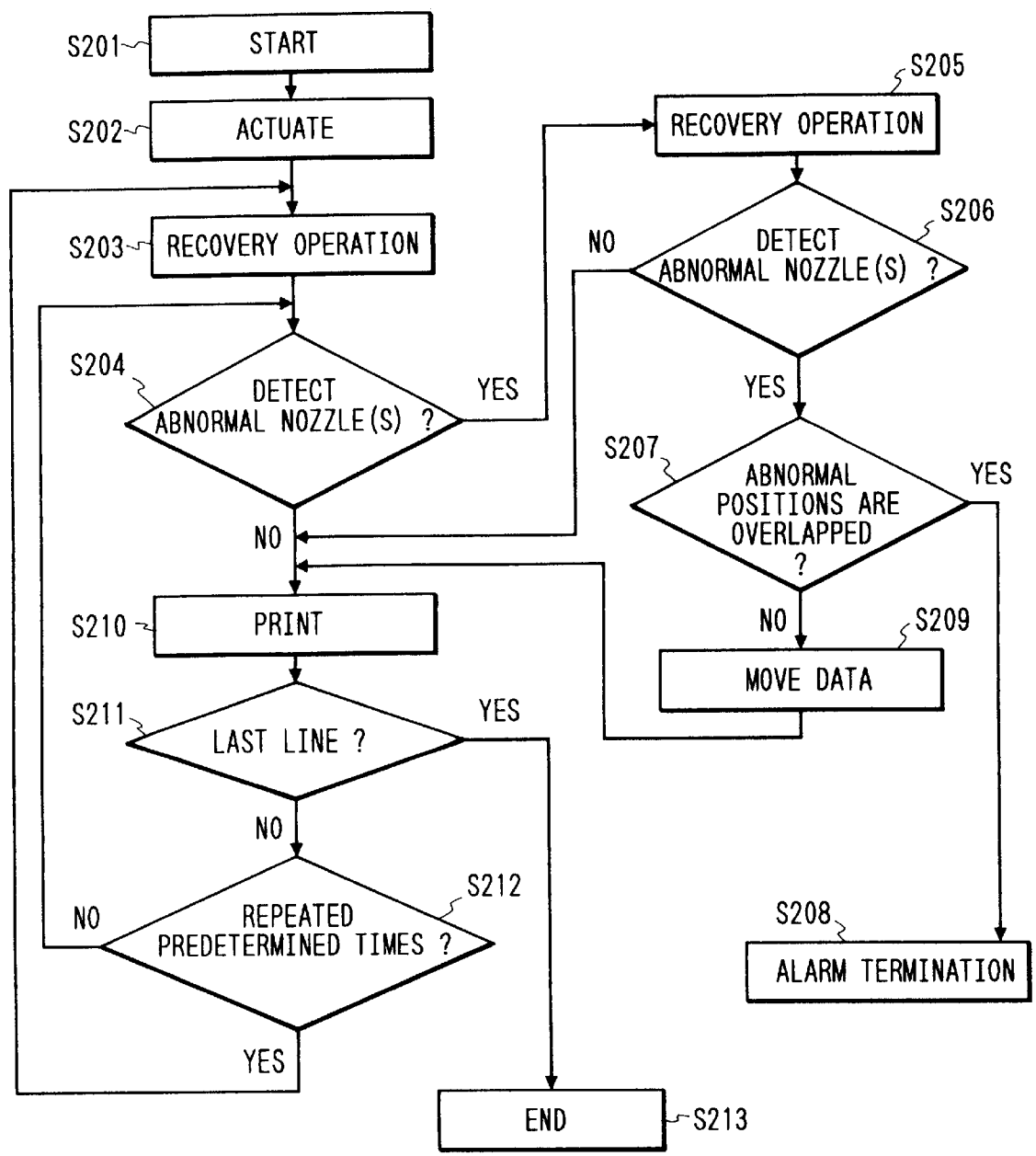
FIG. 16 is a flowchart for showing a complement processing procedure.

Next, the operation of the examples 1 to 4 to be executed by the CPU will be described with reference to a flowchart of FIG. 16. Note that a control program for performing such a process is stored in the ROM.

First, by issuing a start instruction (step S201), the system is actuated (step S202). Next, after the normal discharge recovery operation is performed at step S203, the detection of abnormal nozzles is performed using the reading unit 11 at step S204.

If there is no abnormal nozzle, the procedure transfers to step S210, where the printing with the recording head 7 is performed. On the other hand, if a trouble is detected, the procedure transfers to step S205, where the recovery operation is performed. Next, at step S206, the detection of abnormal nozzles is performed again, in which if no trouble is confirmed, the procedure transfers to step S210, where the printing is performed. On the other hand, if a trouble is confirmed, a check is made at step S207 to determine whether or not the nozzle having caused the trouble and the nozzle being subjected to the complement operation are overlapped. As a result, if overlapped, both the nozzles are abnormal and therefore can not be complemented, in which the procedure transfers to step S208, where a warning is issued and the operation of the recording apparatus is stopped.

When the abnormal nozzles are not overlapped, the data movement is performed with the above method at step S209, and then the procedure transfers to step S210, where the printing is performed. If the printing of that line is completed, a check is made at step S211 to determine whether or not that line is a last line. If it is a last line, the printing is terminated at step S213. If there remain some lines to be printed, the procedure transfers to step S212, where a check is made to determine whether or not the procedure is repeated predetermined times (e.g., five lines). If repeated predetermined times, the procedure returns to step S203, where the recovery operation is performed. On the other hand, if not repeated predetermined times, the procedure returns to step S204, where the detection operation of abnormal nozzles is executed. In the following, the same procedure is repeated.

Figure 17:
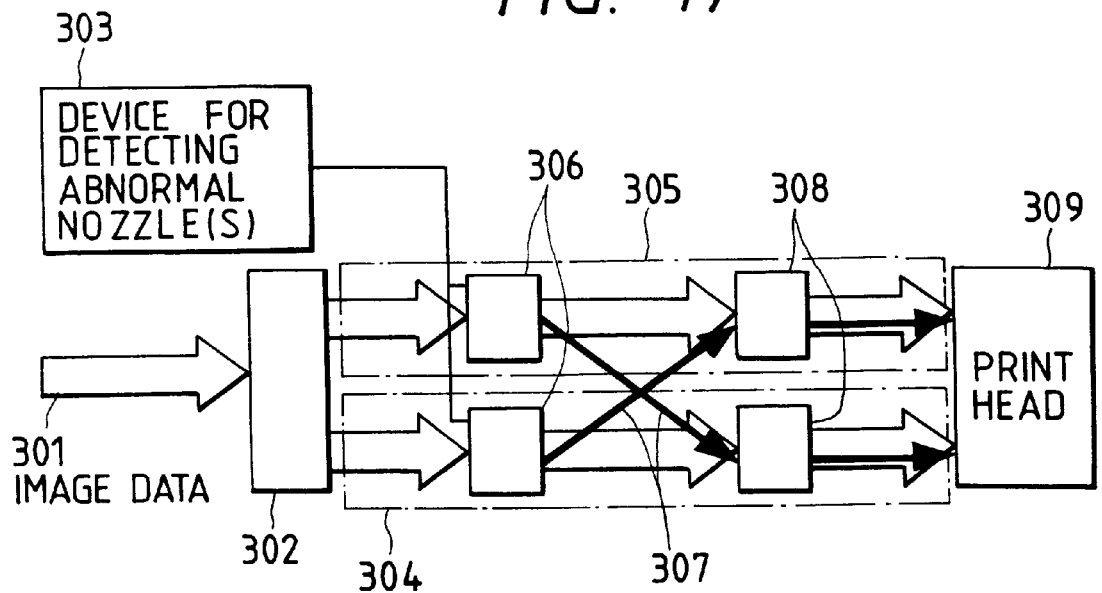
FIG. 17 is a view for explaining the flow of image data.
Figure 18:
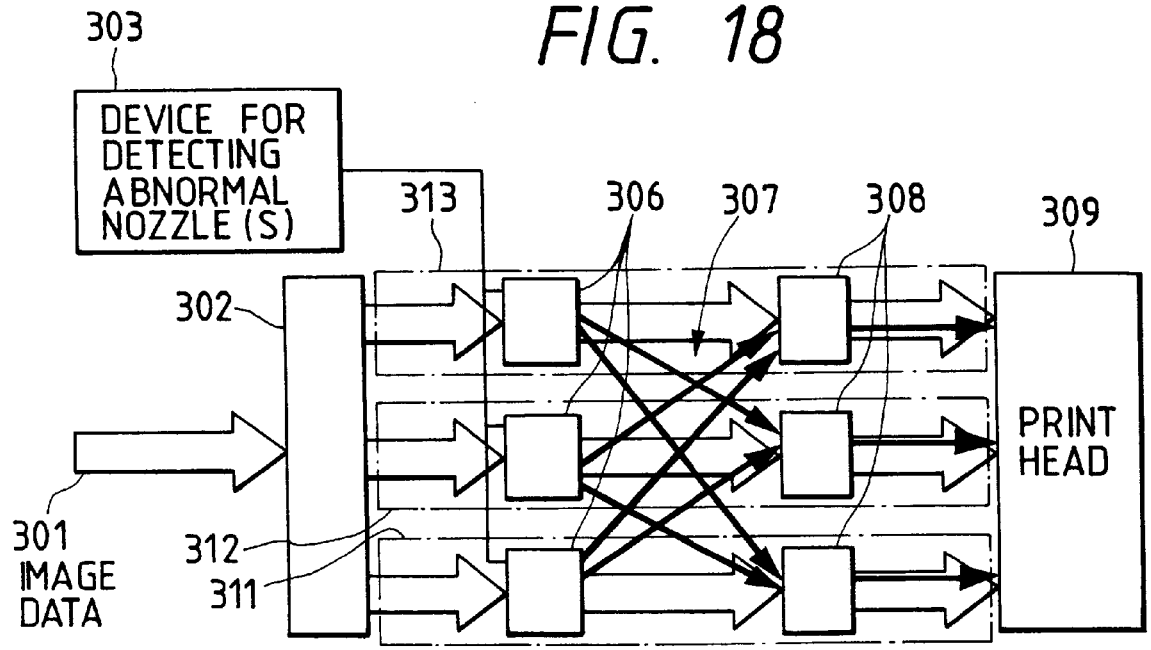
FIG. 18 is a view for explaining the flow of image data.
Figure 19:
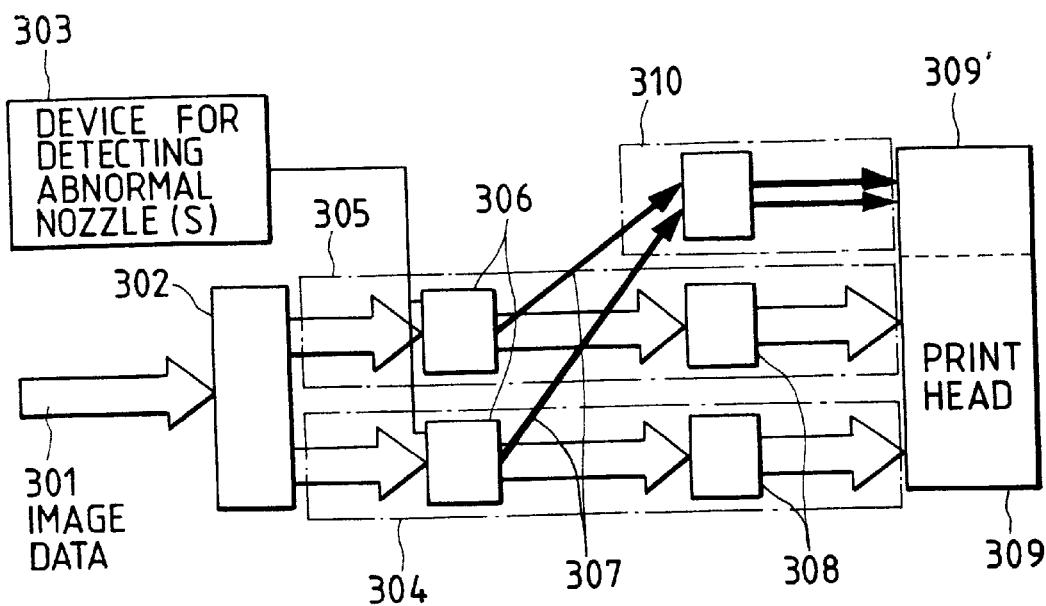
FIG. 19 is a view for explaining the flow of image data.

FIGS. 17, 18 and 19 are diagrams for explaining the flow of image data. FIG. 17 is concerned with example-1 and example-2 (corresponding to FIGS. 10A to 12), wherein the image data 301 is divided into odd number scan data 304 and even number scan data 305 by a data divider 302. In accordance with the output of an abnormal nozzle detecting device 303, a device for cutting out abnormal image data portion 306 is operated, wherein an abnormal image data portion 307 is transferred to the other scan data. The transferred data is superimposed by a data superimposing device 308, and transferred to a print head 309 for executing the printing.

FIG. 18 is an explanation diagram in an extended version of three divisions and three superimpositions, wherein data is divided into the (3n+1)-th scan data 311, the (3n+2)-th scan data 312 and the (3n+3)-th scan data 313 (n is an integer more than or equal to zero), the abnormal image data portion 307 of leading print block being transferred respectively to the next scan data, but the abnormal image data portion 307 of trailing print block is transferred to the scan data prior to the corresponding scan.

FIG. 19 is an explanation diagram for the example-3 (corresponding to FIG. 13), wherein the abnormal data 307 is stored in a complemental data area 310 and transferred therefrom to a complemental print block 309' of the print head 309 for executing the printing.

As the effects of the present invention, there is included the fact that the recording apparatus is not stopped even if an abnormal nozzle occurs, so that the span of life of the recording head is greatly extended.

In FIGS. 11 and 12, there is no problem in service as long as even if undischarge occurs in respective one of the print blocks A and B, no positional coincidence takes place. In the case of FIG. 13, unless non-discharge of the print blocks A1 and A2 coincide, or non-discharge of the print block A1/A2 coincides with that of the print block B, there is no problem in service.

That is, even if the conventional non-discharge recovery function is activated, irreversible abnormal nozzles will increase as the operation progresses, but if at least one of them causes a coincidence, the complement becomes impossible, at which point the practical span of life of head in the present invention expires. Since the print block is formed of several hundreds to thousands of nozzles, there is only a low probability that abnormal nozzles coincide and complete the span of life even though the trouble is involved in several tens of nozzles. In fact, only when the discharge heater is worn as a whole, producing a number of abnormal nozzles, the span of life will expire.

If it is presumed that the span of life expires when only one nozzle becomes abnormal, as is conventional, abnormal nozzles are produced in most cases due to accident failure mode, so that the span of life of head involves a great dispersion ranging from the extremely short span to the relatively long span. On the contrary, as in the present invention, if several tens of nozzles are presumed to be abnormal, they are possibly caused due to wear failure mode, resulting in the effective span of life extended to a few to several tens of times and very small dispersion, wherein there is the merit that besides the cost itself being reduced, the budget estimate for the apparatus operation is easy to make.

The specific effects of the present invention can be summarized as follows.

(1) The ink jet print image with no defect can be obtained by solving a basic problem associated with the ink jet print technique, namely, a problem on the image caused by the abnormal nozzle (i.e., a problem on the image involving not only the non-discharge of ink, but also "deviation" or abnormal dot size).

(2) As the print head with abnormal nozzles can be used as "non-defective", the yield can be improved in the production even for the multi-nozzle head having several hundreds to several thousands of nozzles.

(3) Since if abnormal nozzles occur during use, the complement function is activated one after another, the effective span of life of the recording head can be remarkably extended.

(4) By virtue of the use of the multi-nozzle head having several hundreds to several thousands of nozzles with substantially low costs and the effective long span of life of the head, the recording apparatus using the multi-nozzle head can be operated continuously until the effective span of life of the recording head expires, thereby affording the ink jet print technique the productivity and profitability enough to be industrially meaningful.

It should be noted that the present invention is not necessarily limited narrowly to the embodiment. While in this embodiment, one print head is divided into the print blocks, it will be appreciated that each print block may be in charge of a different recording head. In this case, as the recording head is fed by one sub-scan by a length w of the recording head, the print speed can be enhanced.

This technique is not only applicable to an ink jet recording apparatus using electricity-heat converters for discharging the ink through the nozzles, but also to an ink jet recording apparatus using converters such as piezo elements for discharging the ink through the nozzles, and a recording apparatus having a number of recording elements such as a thermal recording apparatus using a thermal transfer recording method and a thermosensitive paper.

Note that in the thermal recording apparatus, almost all print troubles are caused by the heater disconnection, and a detecting mechanism for abnormal recording elements may be realized by the heater disconnection detection as above described.

Figure 20:
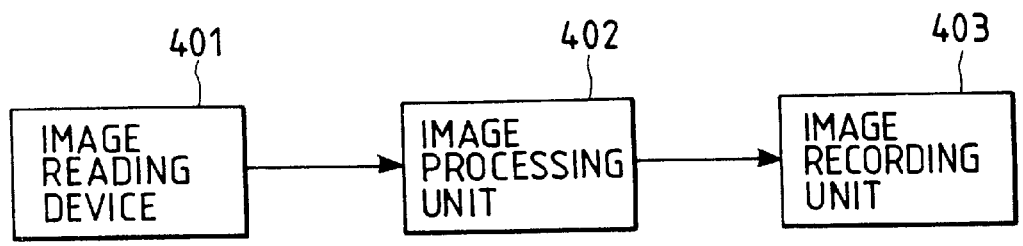
FIG. 20 is a block diagram of a recording apparatus for recording onto the cloths.
Figure 21:
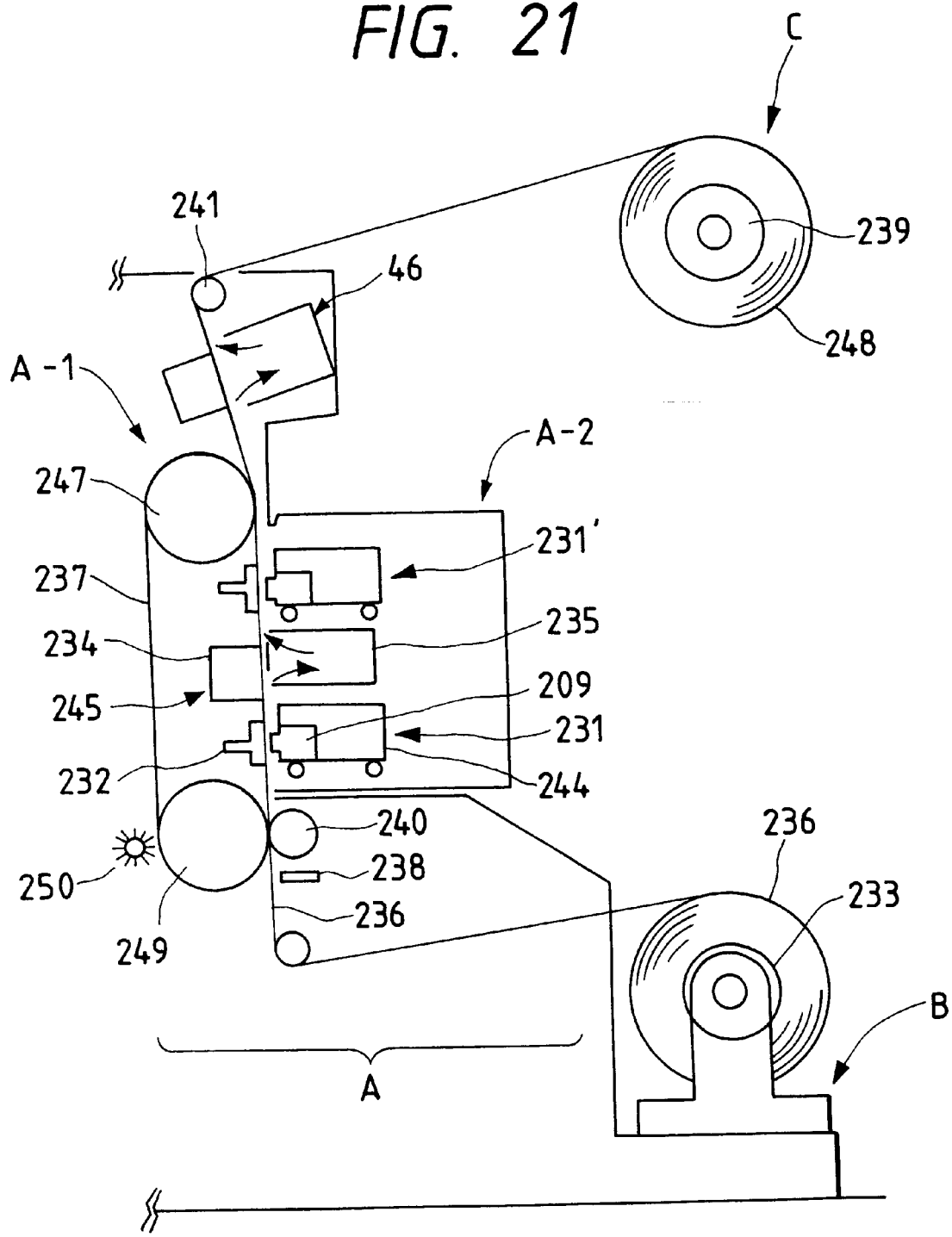
FIG. 21 is a view showing the constitution of an image recording unit in the recording apparatus for recording onto the cloths.

FIGS. 20 and 21 are diagrams showing a basic configuration of an ink jet recording apparatus for performing the printing on the cloths to which one embodiment of the present invention is applied.

This ink jet recording apparatus is constituted as a system, principally consisting of an image reading device 401 for reading an original image created by a designer and converting the original image into original data represented by an electrical signal, an image processing unit 402 for processing original data from the image reading apparatus 401 to be output as image data, and an image recording unit 403 for recording onto the recording medium such as cloths on the basis of image data created by the image processing unit 402.

The image reading device 401 reads an original image with a CCD image sensor.

The image processing unit 402 creates data of driving an ink jet recording unit A-2 (see FIG. 21) for discharging four color inks of magenta (code M), cyan (code C), yellow (code Y) and black (code Bk) as will be described later from input original data. The creation of data involves the image processing for reproducing original image in ink dots, the coloration for determining color tone, and the processing or selection of design size, such as alteration, enlargement or reduction of layout.

In the image recording unit 403, the printing is performed by the ink jet recording unit A-2.

FIG. 21 is a typical view showing schematically a preferred image recording unit for the recording apparatus for textile printing as above described. This recording apparatus is largely comprised of a cloths supply unit B for supplying the recording medium such as a roll of cloths pretreated for the textile printing, a main unit for performing the printing with an ink jet head by feeding accurately the recording medium supplied thereto, and a winding unit C for winding the printed recording medium after being dried. And the main unit A consists of a precision feeding unit A-1 for recording medium including a platen and an ink jet recording unit A-2.

The operation of this apparatus will be described below in connection with the textile printing using the recording medium pretreated therefor.

Pretreated roll-like recording medium 236 is delivered from the cloths supply unit B to the main unit A. In the main unit, a thin endless belt 237 which is precisely driven stepwise is looped around a drive roller 247 and a winding roller 249. The drive roller 247 is directly driven stepwise by a stepping motor (not shown) of high resolution to feed the belt stepwise by the amount of steps. Supplied cloth 236 is pressed on the surface of the belt 237 backed up by the winding roller 249 by a presser roller 240, and adhered thereto.

The recording medium 236 fed stepwise by the belt is positioned in a first print unit 231 by means of a platen 232 on the back side of belt, and printed by an ink jet head 209 on its front side. Every time one line of print is terminated, the recording medium is fed by a predetermined step, and then dried through the heating by a heating plate 234 on the back side of belt, and the hot air on the front side supplied/vented by a hot air duct 235. Subsequently, in a second print unit 231', overlap printing is performed in the same way as in the first print unit.

The printed recording medium is peeled off to be dried again through a post drying unit 246 which is similar to the heating plate 234 and the hot air duct 235 as previously described, and wound around a winding roll 248 while being guided by a guide roll 241. And such wound recording medium 236 is removed from the main apparatus, and subjected to the post-treatments such as coloring, cleaning, and drying in batch processing to provide the final product.

Next, the details of the ink jet recording unit A-2 will be described with reference to FIG. 22.

Herein, in a preferred embodiment, image data is divided into a plurality of image data, wherein one of the divided image data is printed by a head in the first print unit and passed through a drying process, and the other image data which has not been printed in the first print unit is printed by a head in the second print unit, with the head discharging the ink.

Figure 22:
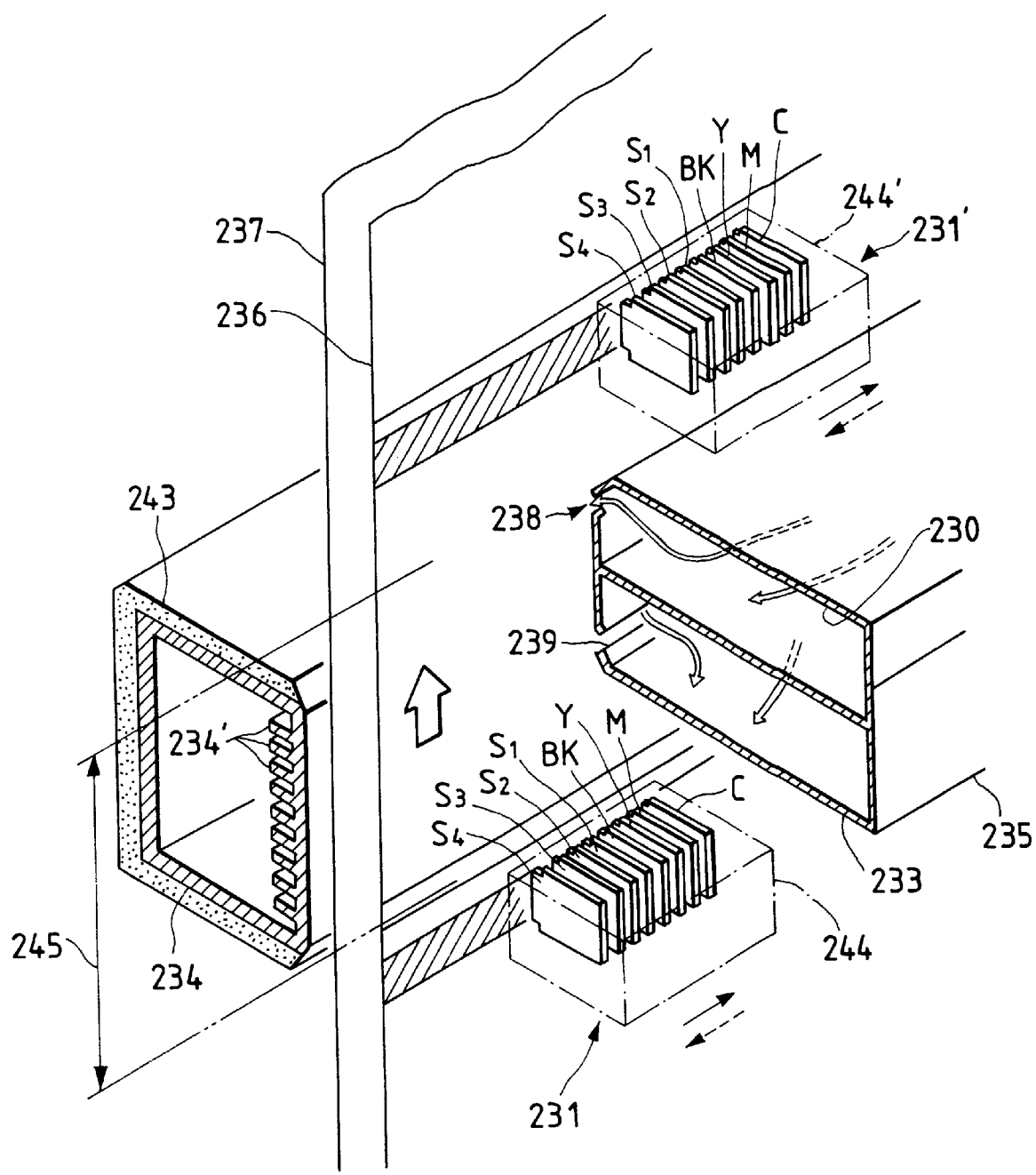
FIG. 22 is a view showing part of the image recording unit in the recording apparatus for recording onto the cloths.

In FIG. 22, the recording medium 236 is adhered onto the belt 237, and fed stepwise in the upper direction in the figure. The first print unit 231 provided downward in the figure is provided with a first carriage 244 having mounted thereon eight ink jet heads for Y, M, C, Bk and special colors S1 to S4. The ink jet head (recording head) in this embodiment has elements for generating the heat energy causing film boiling in the ink as the energy used to discharge the ink, and has 128 discharge orifices arranged with a density of 400 dpi (dots/inch).

Downstream of the first print unit is provided a drying unit 245 comprised of a heating plate 234 for heating from the back side of the belt, and a hot air duct 235 for drying from the front side. A heat transfer surface of the heating plate 234 is pressed against an endless belt 237 which is strongly tensioned to heat strongly the belt 237 from the back side thereof with the vapor of high temperature and high pressure passing through the hollow inside. The belt 237 heats directly the recording medium 236 adhered thereto effectively with the heat transfer. On the inner face of the heating plate, the fins 234' for the collection of heat are provided to concentrate the heat on the back side of the belt efficiently. The side not in contact with the belt is covered with a heat insulating member 243 to prevent the heat radiation to cause the loss of heat.

On the front side, the air of lower humidity is applied to the drying recording medium 236 by blowing the dry hot air from a supply duct 230 provided downstream thereof, so that further effects are obtained. And the air containing sufficient moisture and flowing in the opposite direction to a conveying direction of the recording medium 236 is sucked in a much greater amount than a blowing amount from a suction duct 233 provided upstream thereof so as to prevent the evaporated water contents from condensating on surrounding mechanical components. A supply source of hot air is provided on the rear side as shown in FIG. 22, and the suction is performed on the fore side, so that the pressure difference between a blowout opening 238 and a suction opening 239 placed opposed to the recording medium 236 is rendered uniform over the entire area in a longitudinal direction. Air blowing/suction unit is offset downstream with respect to a center of the heating plate 234 provided on the back side, so that the air may be blown to a sufficiently heated portion. Thereby, the first print unit 231 can strongly dry the recording medium 236 containing a quantity of water contents in the ink including a reducer.

On the downstream (upper) side thereof, there is provided a second print unit 231' which is comprised of a second carriage 244' of the same constitution as the first carriage.

In the above example, the present invention is also applicable wherein the total length of recording element row is defined as a sum of the length for the head in the first print unit and the length for the head in the second print unit, for example, and with the head in the first print block as one block and the head in the second print block as the other block, image data involved with abnormal recording element is printed by the use of the recording element of the other block containing no abnormal recording elements.

Next, a specific example of the ink jet textile printing will be described. Using an ink jet recording apparatus as shown in FIG. 21, the recording medium, after passing through an ink jet textile printing process, is subjected to drying (including the air drying). And subsequently the recording medium is subjected to a process in which the dye on recording medium fiber is diffused, and fixed thereto. With this process, sufficient coloration and fastness with the fixing of dye can be obtained.

This diffusion and fixing process may be any one of conventionally well-known methods, such as for example, a steaming method. Note that before textile printing, the recording medium may be subjected to alkaline treatment.

Thereafter, in the post-treatment process, the removal of the dye on the reaction and the removal of the substance used in the pre-treatment are performed. Finally, a general finishing process including defect correction and ironing is passed through, whereby the printing is completed.

In particular, the ink jet textile printing cloths are required to have the properties such as:

(1) the ability of coloring the ink at sufficient density
(2) a high dyeing rate of ink
(3) the ability of drying the ink on the cloths rapidly
(4) less occurrence of irregular ink bleeding on the cloths
(5) excellent conveyance within the apparatus To meet these requirements, the cloths may be pre-treated as necessary. For example, in Japanese Laid-Open Patent Application No. 62-53492, several kinds of cloths having the ink receiving layer have been disclosed, and in Japanese Patent Publication No. 3-46589, cloths containing reduction inhibitor or alkaline substances have been proposed. An example of such pre-treatment includes treating the cloths to contain a substance selected from alkaline substance, water soluble polymer, synthetic polymer, water soluble metallic salt, urea, and thiourea.

Examples of alkaline substance include alkaline metal hydroxide such as sodium hydroxide and potassium hydroxide, amines such as mono-, di-, or tri- ethanolamine, and alkaline metal carbonate or bicarbonate such as sodium carbonate, potassium carbonate and sodium bicarbonate. Further, they include organic acid metallic salt such as calcium acetate and barium acetate, ammonia and ammonium compounds. Also, sodium trichloroacetate which becomes an substance under the steaming and heating may be used. Particularly preferable alkaline substances may be sodium carbonate and sodium bicarbonate for use in coloring of reactive dye.

Examples of water soluble polymer include starch substances such as corn and wheat flour, cellulose substances such as carboxymethyl cellulose, methyl cellulose and hydroxyethyl cellulose, polysaccharides such as sodium alginate, gum arabic, locust beam gum, tragacanth gum, guar gum, and tamarind seeds, protein substances such as gelatine and casein, and natural water soluble substances such as tannium and lignin.

Also, examples of synthetic polymer include polyvinyl alcohol compounds, polyethylene oxide compounds, acrylic acid type water soluble polymer, and maleic anhydride type water soluble polymer. Among them, polysaccharide polymer and cellulose polymer are preferable.

Examples of water soluble metallic salt include compounds having a pH of 4 to 10 and making typical ionic crystals such as halides of alkaline metal and alkaline earth metal. Typical examples of such compounds include alkaline metals such as NaCl, $Na_2SO_4$, KCL and $CH_3COONa$, and alkaline earth metals such as $CaCl_2$ and $MgCl_2$. Among them, salts of Na, K and Ca are preferable.

The method of pre-treating the cloths to contain any one of the above-cited substances is not specifically limited, but may be normally any one of dipping, pad, coating, and spray methods.

Further, because the textile printing ink applied to the cloths for ink jet textile printing may only adhere to the surface of the cloths in the applied state, it is preferable to subsequently perform a dye fixing process (dyeing process) to the fiber. Such fixing process may be any one of conventionally well-known methods; for example, a steaming method, an HT steaming method, or a thermofix method, and when not using the cloths pretreated with alkali, an alkali pad steam method, an alkali blotch steam method, an alkali shock method, and an alkali cold fix method.

Further, the removal of unreacted dye and substances used in pre-treatment can be made by washing in accordance with a conventionally well-known method after the reactive fixing process. Note that it is preferable to use a conventional fix process jointly with washing.

Note that the printed matter subjected to the post-treatment as above described is cut off in a desired size, cut pieces are subjected to a process for obtaining the final product such as suturing, bonding, or welding, to thereby provide a one-piece dress, a dress, a necktie, a swimsuit, an apron, a scarf, a quilt cover, a sofa cover, a handkerchief, a curtain, a book cover, room shoes, a tapestry, a table-cloth, and so on. Numerous methods of processing the cloths by suturing to provide clothes or other daily needs having been described in well-known publications, such as "Modern knitwear manual", published by Seni-journal, and monthly "Souen", published by Bunka Shuppan.

The present invention brings about excellent effects particularly in a recording head or a recording device of the ink jet system for recording by forming fine ink droplets with the heat energy among the various ink jet recording systems.

As to its representative constitution and principle, for example, one practiced by use of the basic principle disclosed in, for example, U.S. Pat. Nos. 4,723,129 and 4,740, 796 is preferred. This system is applicable to either of the so-called on-demand type and the continuous type. Particularly, the case of the on-demand type is effective because, by applying at least one driving signal which gives rapid temperature elevation exceeding nucleate boiling corresponding to the recording information to electricity-heat converters arranged corresponding to the sheets or liquid channels holding a liquid (ink), heat energy is generated at the electricity-heat converters to effect film boiling at the heat acting surface of the recording head, and consequently the bubbles within the liquid (ink) can be formed corresponding one by one to the driving signals. By discharging the liquid (ink) through an opening for discharging by growth and shrinkage of the bubble, at least one droplet is formed. By making the driving signals into the pulse shapes, growth and shrinkage of the bubbles can be effected instantly and adequately to accomplish more preferably discharging of the liquid (ink) particularly excellent in response characteristic.

As the driving signals of such pulse shape, those as disclosed in U.S. Pat. Nos. 4,463,359 and 4,345,262 are suitable. Further excellent recording can be performed by employment of the conditions described in U.S. Pat. No. 4,313,124 of the invention concerning the temperature elevation rate of the above-mentioned heat acting surface.

As the constitution of the recording head, in addition to the combination of the discharging orifice, liquid channel, and electricity-heat converter (linear liquid channel or right-angled liquid channel) as disclosed in the above-mentioned respective specifications, the constitution by use of U.S. Pat. No. 4,558,333 or 4,459,600 disclosing the constitution having the heat acting portion arranged in the flexed region is also included in the present invention.

In addition, the present invention can be also effectively made the constitution as disclosed in Japanese Laid-Open Patent Application No. 59-123670 which discloses the constitution using a slit common to a plurality of electricity-heat converters as the discharging portion of the electricity-heat converter or Japanese Laid-Open Patent Application No. 59-138461 which discloses the constitution having the opening for absorbing pressure waves of heat energy correspondent to the discharging portion.

In addition, the present invention is effective for a recording head of the freely exchangeable chip type which enables electrical connection to the main device or supply of ink from the main device by being mounted on the main device, or a recording head of the cartridge type having an ink tank integrally provided on the recording head itself.

Also, addition of a restoration means for the recording head, a preliminary auxiliary means, etc., provided as the constitution of the recording device of the present invention is preferable, because the effect of the present invention can be further stabilized. Specific examples of these may include, for the recording head, capping means, cleaning means, pressurization or suction means, electricity-heat converters or another type of heating elements, or preliminary heating means according to a combination of these, and it is also effective for performing stable recording to perform preliminary mode which performs discharging separate from recording.

Further, as the recording mode of the recording device, the present invention is extremely effective for not only the recording mode only of a primary color such as black etc., but also a device equipped with at least one of plural different colors or full color by color mixing, whether the recording head may be either integrally constituted or combined in plural number.

Though the ink is considered as the liquid in the embodiments as above described, another ink may be also usable which is solid below room temperature and will soften or liquefy at or above room temperature, or liquefy when a recording enable signal is issued as it is common with the ink jet device to control the viscosity of ink to be maintained within a certain range of the stable discharge by adjusting the temperature of ink in a range from 30° C. to 70° C.

In addition, in order to avoid the temperature elevation due to heat energy by positively utilizing the heat energy as the energy for the change of state from solid to liquid, or to prevent the evaporation of ink by using the ink which will stiffen in the shelf state, the use of the ink having a property of liquefying only with the application of heat energy, such as liquefying with the application of heat energy in accordance with a recording signal so that liquid ink is discharged, or may solidify prior to reaching a recording medium, is also applicable in the present invention. In such a case, the ink may be held as liquid or solid in recesses or through holes of a porous sheet, which is placed opposed to electricity-heat converters, as described in Japanese Laid-Open Patent Application No. 54-56847 or No. 60-71260. The most effective method for the ink as above described in the present invention is based on the film boiling.

Further, a recording apparatus according to the present invention may be used in the form of a printer integrally or separately provided as the image output terminal for use in an information processing equipment such as a word processor or a computer, a copying machine in combination with a reader, or a facsimile terminal equipment having the transmission and reception feature.

Figure 23:
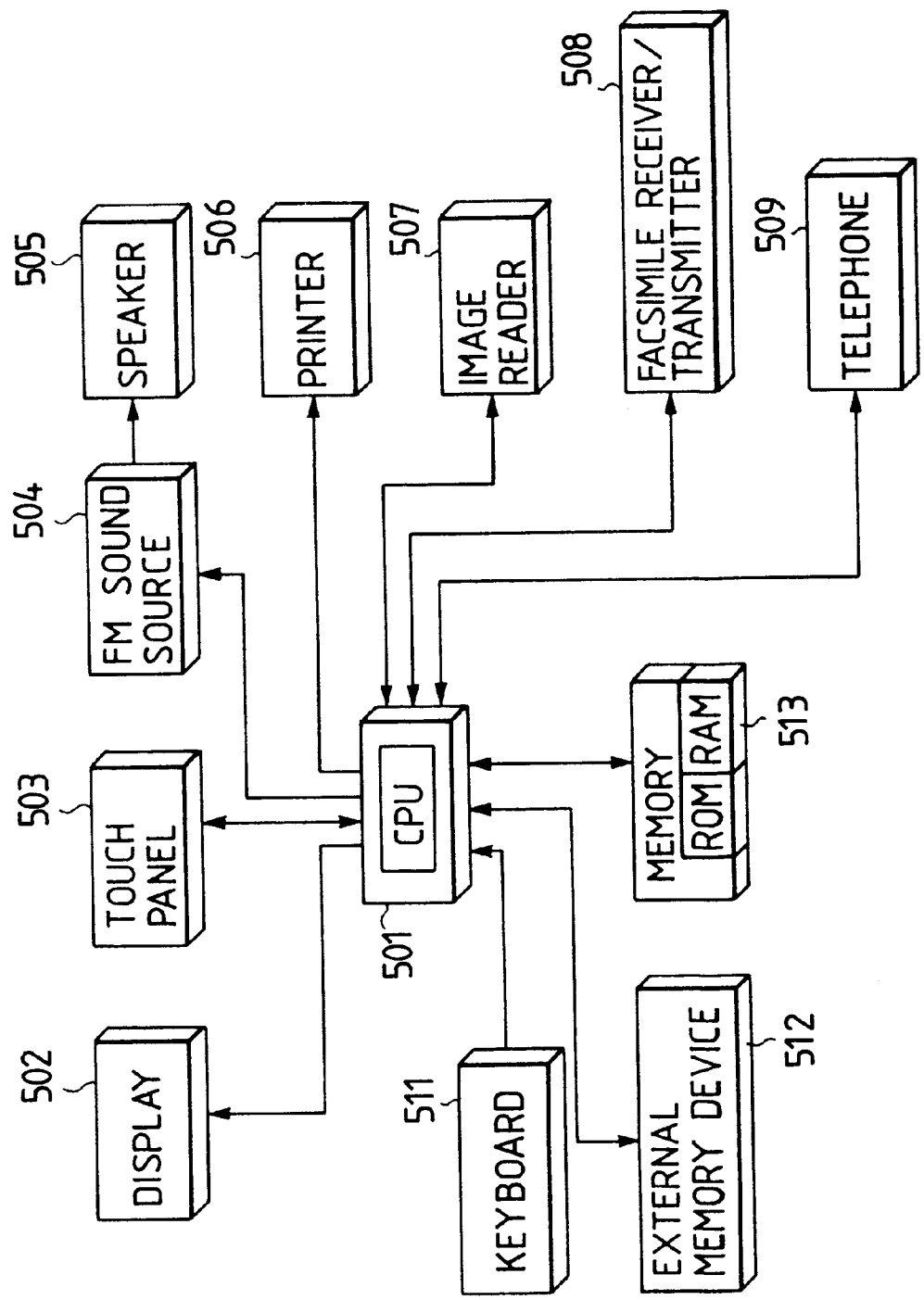
FIG. 23 is a block diagram showing a schematic constitution in which the recording apparatus is applied to an information processing equipment.

FIG. 23 is a block diagram showing a schematic configuration in which a recording apparatus of the present invention is applied to the information processing apparatus having the features of a word processor, a personal computer, a facsimile terminal equipment, a copying machine and an electronic typewriter. In the figure, 501 is a control unit for controlling the whole apparatus, wherein it comprises a CPU such as a microprocessor or various I/O ports, and controls by outputting or inputting a control signal or data signal to or from each of sections, respectively. Reference numeral 502 is a display section, which displays various kinds of menus, document information, and image data read by an image reader 507 on the display screen, 503 is a transparent, pressure sensitive touch panel provided on the display section 502, which enables the entry of an item or coordinate value on the display section 502 by depressing its surface with a finger or the like.

Numeral 504 is an FM (Frequency Modulation) sound source section, which makes the FM modulation for the music information created on the music editor, which is then stored in and read from a memory 510 or an external storage device 512 as the digital data. An electrical signal from the FM sound source section 504 is converted into audible sound by a speaker section 505. A printer section 506 is useful as the output terminal for a word processor, a personal computer, a facsimile terminal equipment, a copying machine, or an electronic typewriter, to which a recording apparatus according to the present invention is applied.

Numeral 507 is an image reader section which reads original data photoelectrically, and is provided midway on the conveying path of original to read a facsimile or copying original, and other various types of original. Numeral 508 is a FAX receiving/transmitting section for FAX transmitting original data read by the image reader section 507 or for FAX receiving and decoding facsimile signals that are transmitted thereto, which has an interface facility with the outside. Numeral 509 is a telephone section comprising various telephone features, such as ordinary telephone or automatic answering telephone. Numeral 510 is a memory section comprising a ROM for storing system programs, manager programs and other application programs, character fonts, and dictionaries, a RAM for storing an application program loaded from the external storage device 512 and character information, and a video RAM.

Numeral 511 is a keyboard section for inputting document information or various commands. Numeral 512 is the external storage device which is a storage medium consisting of floppy disk or hard disk, wherein this external storage device 512 is used to store character information, music or audio data, and user's application programs.

Figure 24:
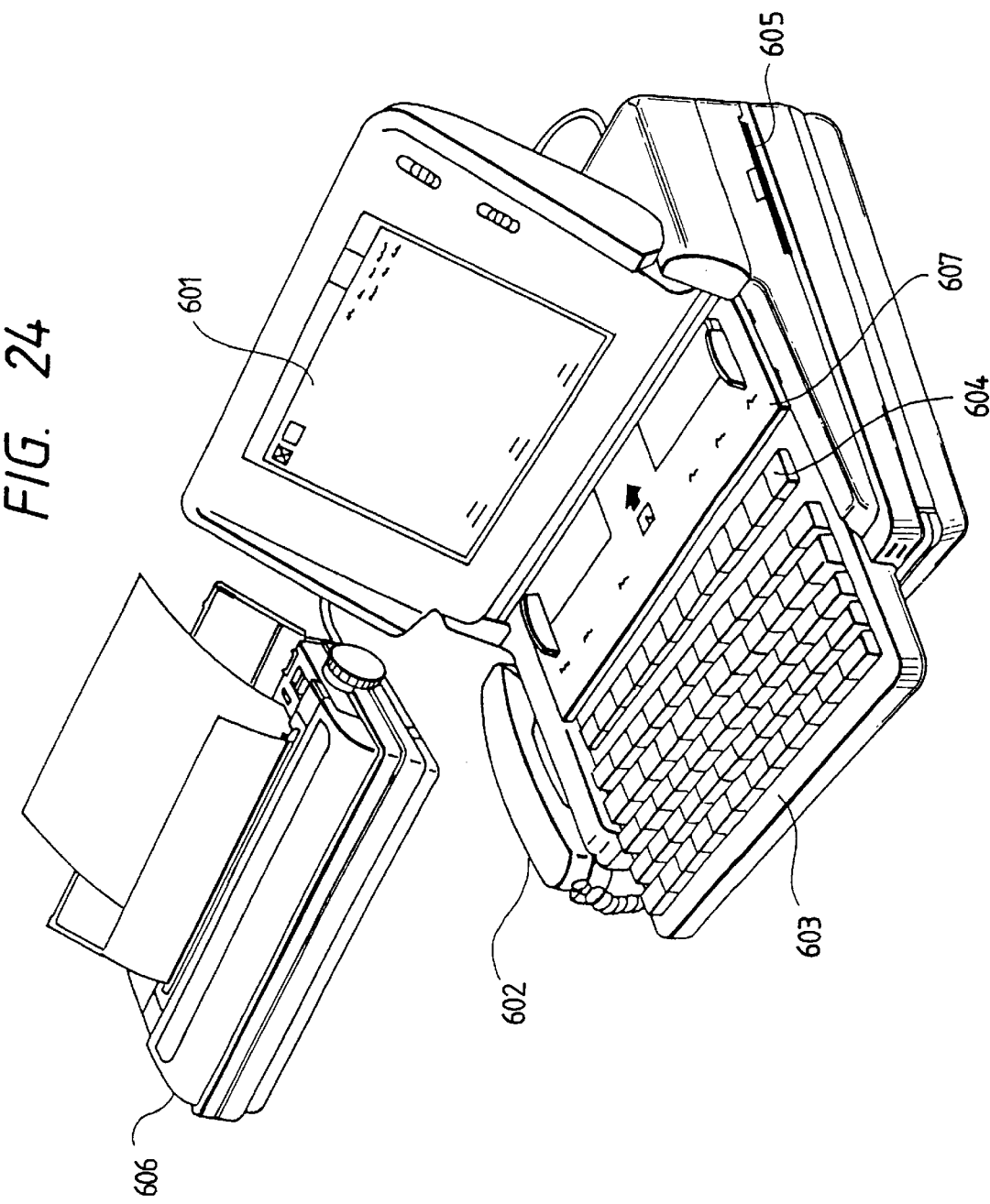
FIG. 24 is an external view of the information processing equipment.

FIG. 24 is an appearance view of the information processing apparatus as shown in FIG. 23. In the figure, 601 is a flat panel display formed of a liquid crystal for displaying various kinds of menus, graphic data or document information. On this display 601 is installed a touch panel, which enables the entry of coordinate or specified item by depressing the surface of the touch panel with a finger or the like. Numeral 602 is a handset to be used when the apparatus functions as a telephone.

A keyboard 603 is detchably connected via a cord to the main device, and is used to input various character information or data. The keyboard 603 is also provided with various function keys 604. Numeral 605 is an opening for insertion of the floppy disk.

Numeral 607 is a paper laying board for laying thereon a paper to be read by the image reader section 607, in which a read paper is exhausted from the rear side of device. In the facsimile reception, received data is recorded by a printer 607.

It should be noted that the display 601 may be a CRT, but is preferably a flat panel such as a liquid crystal display using a ferroelectric liquid crystal. This is because the display can be made more compact, thinner, and lighter. When the above mentioned information processing apparatus functions as a personal computer or a word processor, various information input from the keyboard 511 in FIG. 23 are processed according to a predetermined program by the control unit 501, and output to the printer 506 as the image. When it functions as a receiver for the facsimile terminal equipment, the facsimile information input from the FAX receiving/transmitting section 508 via the transmission line is received according to a predetermined program by the control section 501, and output to the printer section 506 as the received image.

Figure 25:
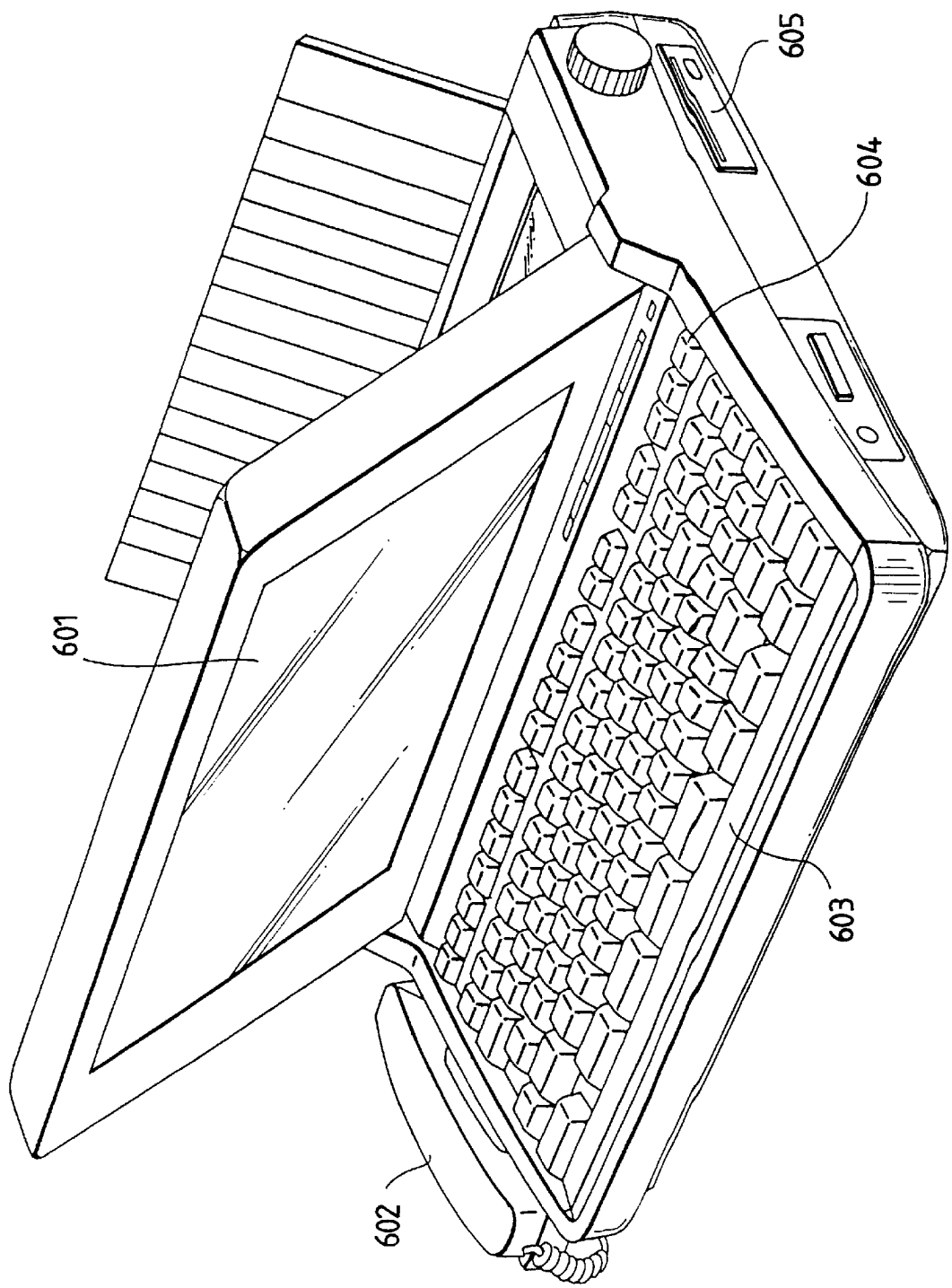
FIG. 25 is an external view of the information processing equipment with a recording apparatus provided integrally therewith.

And when it functions as a copying machine, an original is read by the image reader section 507, and read original data is output via the control unit 501 to the printer section 506 as the copied image. Note that it functions as a transmitter for the facsimile terminal equipment, original data read by the image reader section 507 is processed for transmission according to a predetermined program by the control unit 501, and transmitted by the FAX receiving/transmitting section 508 via the transmission line. It should be noted that the above mentioned information processing apparatus can be of the integral type in which a printer is contained within the main device as shown in FIG. 25, in which its portability can be further enhanced. In the same figure, like reference numerals are affixed to parts having the same functions as those in FIG. 24.

Thus, if a recording apparatus according to the present invention is applied to the multifunctional information processing apparatus as above described, higher quality recording images can be obtained so that the features of the information processing apparatus can be further improved.

As above detailed, according to the present invention, even if there occurs a trouble in the recording element of recording means, image data to be given to abnormal recording element is moved to image data to be given to the other recording element, so that the recording can be complemented by the other recording element, whereby a non-defective desired image can be obtained.

What is claimed is:

1. A recording apparatus comprising:
   main scan means for scanning recording means having a recording element row of a plurality of recording elements for applying ink onto a recording medium, said main scan means scanning the recording means in a different direction from that of said recording element row, relatively to the recording medium;
   sub-scanning means for sub-scanning said recording means and the recording medium relatively in a direction of said recording element row by a smaller amount than the total length of said recording element row after every main scan;
   image data supply means for dividing predetermined image data into sets of image data which are complementary to each other and supplying said divided sets of image data to different blocks of recording elements in the recording element row in each main scan to record said predetermined image data in a plurality of main scans by different blocks of said recording elements;
   detection means for detecting an abnormal recording element of said recording means, prior to each main scan;
   image data moving means for removing only the image data corresponding to the abnormal recording element detected by said detection means from a set of image data to be supplied to the block to which said abnormal recording element belongs and overlapping said removed image data with a set of image data to be supplied to another block at another main scan to record at the same area of the recording medium; and
   recording control means for, when the abnormal recording element is detected by said detection means, recording by using the block of said recording elements to which said abnormal recording element belongs to record at one main scan in accordance with the set of image data from which image data to be supplied to said abnormal recording element is removed by said image data moving means, and for recording by using said recording elements belonging to the other block at the same area as the area recorded at the one main scan in the other main scan in accordance with the set of image data formed by overlapping said removed image data with the set of image data supplied to the other block by said image data moving means.

2. A recording apparatus according to claim 1, wherein said image data moving means removes image data corresponding to the abnormal recording element detected by said detection means from a set of image data to be supplied to the block to which said abnormal recording element belongs, and moving said removed image data to the other set of image data to be supplied to the other block to superimpose said removed image data thereon for recording on the same area of the recording medium in a main scan after the main scan for recording with the block to which said abnormal recording element belongs.

3. A recording apparatus according to claim 1, wherein said image data moving means removes the image data corresponding to the abnormal recording element detected by said detection means from the set of image data to be supplied to the block in which said abnormal recording element belongs, and moves said image data to the other set of image data to be supplied to the other block to superimpose said image data thereon for recording on the same area of the recording medium in a main scan before the main scan for recording with the block to which said abnormal recording element belongs.

4. An information processing device comprising a recording apparatus according to any one of claims 1 to 3 and calculation means.

5. A recording apparatus according to any one of claims 1 to 3, wherein each said recording element comprises an ink discharge orifice, and performs recording by discharging the ink from said discharge orifice to the recording medium.

6. A recording apparatus according to claim 5, wherein each said recording element causes a state change in the ink by heating, and further comprises heat energy generating means for discharging the ink from said discharge orifice, based on said state change.

7. A recording apparatus according to any one of claims 1 to 3, characterized by being used for textile printing.

8. An image forming device comprising a recording apparatus according to any one of claims 1 to 3 and original image reading means.

9. An image forming device comprising a recording apparatus according to any one of claims 1 to 3 and transmitting means and receiving means for respectively transmitting and receiving image information.

10. An image forming device according to claim 9, further comprising original image reading means.

11. An image forming device comprising a recording apparatus according to any one of claims 1 to 3 and recording signal input means.

12. An image forming means according to claim 11, wherein said recording signal input means comprises a keyboard.

13. A recording apparatus comprising:

main scan means for scanning relative to a recording medium in a main scan direction a plurality of recording sections each having a plurality of recording elements and correction recording means to record on the recording medium with ink;

sub-scan means for relatively sub-scanning the plurality of recording sections, the correction recording means and the recording medium in a direction different from the main scan direction at each main scan;

image data dividing means for dividing image data into a plurality of sets of image data, each set corresponding to one of the plurality of recording sections to record a same area on the recording medium by a plurality of main scans corresponding to each of the recording sections;

detection means for detecting an abnormal recording element among the recording elements in the recording sections;

image data moving means for removing only image data to be supplied to the abnormal recording element from the set of image data corresponding to the main scan for recording by the recording section including the abnormal recording element among the divided sets of image data divided by said image dividing means when said detection means detects that the abnormal recording element exists in the recording elements of the recording sections and moving the removed image data to correction image data corresponding to another main scan recorded by the correction recording means at the same area of the recording medium; and record control means for, when the abnormal recording element is detected by said detection means, recording by driving the recording section to which the abnormal recording element belongs at one main scan in accordance with the set of image data from which image data to be supplied to the abnormal recording element is removed by said image data moving means, and recording the removed image data by driving the correction recording means on the same area as the one main scan at the other main scan in accordance with the image data moved by said image data moving means.

14. A recording apparatus according to claim 13, characterized by being used for textile printing.

15. A recording method comprising the steps of:

scanning in main scans recording means having a recording element row of a plurality of recording elements for applying ink onto a recording medium in a different direction from that of said recording element row, relatively to the recording medium;

sub-scanning said recording means and the recording medium relatively in a direction of said recording element row by a smaller amount than the total length of said recording element row after every main scan;

dividing predetermined image data into sets of image data which are complementary to each other and supplying said divided sets of image data to different blocks of recording elements in the recording element row in each main scan to record said predetermined image data in a plurality of main scans by different blocks of said recording elements;

detecting an abnormal recording element of said recording means, prior to each main scan;

removing only the image data corresponding to the detected abnormal recording element from a set of image data to be supplied to the block to which said abnormal recording element belongs and overlapping said removed image data with a set of image data to be supplied to another block at another main scan to record at the same area of the recording medium; and recording, when the abnormal recording element is detected in said detecting step, by using the block of said recording elements to which said abnormal recording element belongs to record at one main scan in accordance with the set of image data from which image data to be supplied to said abnormal recording element is removed in said image data removing step, and for recording by using said recording elements belonging to the other block at the same area as the area recorded at the one main scan in the other main scan in accordance with the set of image data formed by overlapping said removed image data with the set of image data supplied to the other block by said image data moving means.

16. A recording method according to claim 15, further comprising the steps of forming a recorded portion with the ink on said recording medium, and then fixing the ink in said recorded portion onto said recording medium.

17. A recording method according to claim 16, further comprising the step of washing the recording medium after said fixing step.

18. A recording method according to any one of claims 15 to 17, further comprising the step of providing a pretreatment agent in said recording medium before recording onto said recording medium.

19. A recording method according to any one of claims 15 to 17, wherein said recording medium comprises a cloth made of cotton or silk.

20. The recording method according to any one of claims 15 to 17, characterized in being performed in a textile printing process.

21. A recording apparatus comprising:

main scan means for scanning in a main scan direction relative to a recording medium a plurality of recording sections each having a plurality of recording elements to record on the recording medium with ink;

sub-scan means for relatively sub-scanning the plurality of recording sections and the recording medium in a direction different from the main scan direction at each main scan;

image data dividing means for dividing image data into a plurality of sets of image data, each set corresponding to one of the plurality of recording sections to record a same area on the recording medium by a plurality of main scans corresponding to each of the recording sections;

detection means for detecting an abnormal recording element among the recording elements in the recording sections;

image data moving means for removing only image data to be supplied to the abnormal recording element from the set of image data corresponding to the main scan for recording by the recording section including the abnormal recording element among the divided sets of image data divided by said image data dividing means when said detection means detects that the abnormal recording element exists in the recording elements of the recording sections and moving the removed image data to another set of image data divided by said image data dividing means and corresponding to another main scan for recording on the same area by another recording section of the plurality of recording sections; and record control means for, when the abnormal recording element is detected by said detection means, recording by driving the recording section to which the abnormal recording element belongs at one main scan in accordance with the set of image data from which image data to be supplied to the abnormal recording element is removed by said image data moving means, and recording the removed image data by driving the other recording section on the same area as the one main scan at the other main scan in accordance with the image data moved by said image data moving means to another set of image data to be recorded by another recording section at the other main scan.

22. A recording apparatus according to claim 21, characterized by being used for textile printing.

23. A recording method comprising the steps of:

scanning relative to a recording medium in a main scan direction a plurality of recording sections each having a plurality of recording elements to record on the recording medium with ink;

relatively sub-scanning the plurality of recording sections and the recording medium in a direction different from the main scan direction at each main scan;

dividing image data into a plurality of sets of image data, each set corresponding to one of the plurality of recording sections to record a same area on the recording medium by a plurality of main scans corresponding to each of the recording sections;

detecting an abnormal recording element among the recording elements in the recording sections;

removing only image data to be supplied to the abnormal recording element from the set of image data corresponding to the main scan for recording by the recording section including the abnormal recording element among the divided sets of image data divided when detected in said detecting step that the abnormal recording element exists in the recording elements of the recording sections and moving the removed image data to another set of image data divided corresponding to another main scan for recording on the same area by another recording section of the plurality of recording sections; and recording, when the abnormal recording element is detected, by driving the recording section to which the abnormal recording element belongs at one main scan in accordance with the set of image data from which image data to be supplied to the abnormal recording element is removed, and recording the removed image data by driving the other recording sections on the same area as the one main scan at another main scan in accordance with the image data moved to another set of image data to be recorded by another recording section at the other main scan.

24. A recording method according to claim 23, characterized in being performed in a textile printing process.

25. A recording apparatus comprising:

a plurality of recording sections each having a plurality of recording elements for recording on a recording medium with ink;

scan means for causing relative movement between said plurality of recording sections and the recording medium;

detecting means for detecting an abnormal recording element among said recording elements of said recording sections;

image data dividing means for dividing image data for recording a same area of the recording medium into a plurality of sets of divided image data which are complementary to each other, each set of the divided image data corresponding to one of said plurality of recording sections so as to complete recording on the same area by driving each of said plurality of recording sections;

image data moving means for removing only image data to be supplied to said abnormal recording element from a first set of divided image data to be supplied to a first recording section of said recording sections that includes said abnormal recording element when said detecting means detects that said abnormal recording element is among said recording elements of said first recording section, and adding the removed image data to a second set of divided image data to be supplied to a second recording section for recording the same area on the recording medium; and control means for causing said first recording section to record in accordance with the first set of divided image data after the image data to be supplied to said abnormal recording element is removed by said image data moving means and causing said second recording section to record on the same area as the area where said first recording section records in accordance with the second set of divided image data added with the removed image data by said image data moving means, said first recording section and said second recording section completing recording on the same area of the recording medium.

26. An apparatus according to claim 25, further comprising means for moving said plurality of recording sections in a direction different from the direction of relative movement caused by said scan means.

27. A recording apparatus comprising:

a plurality of recording sections each having a plurality of recording elements for recording on a recording medium with ink;

scan means for causing relative movement between said plurality of recording sections and the recording medium;

detecting means for detecting an abnormal recording element among said recording elements of said recording sections;

image data dividing means for dividing image data for recording a same area of the recording medium into a plurality of sets of divided image data which are complementary to each other, each set of the divided image data corresponding to one of said plurality of recording sections so as to complete recording on the same area by driving each of said plurality of recording sections;

image data adding means for adding image data to be supplied to said abnormal recording element in a first set of divided image data to be supplied to a first recording section of said recording sections that includes said abnormal recording element when said detecting means detects that said abnormal recording element is among said recording elements of said first recording section to a second set of divided image data to be supplied to a second recording section for recording the same area on the recording medium; and control means for causing said first recording section to record in accordance with the first set of divided image data and causing said second recording section to record on the same area as the area where said first recording section records in accordance with the second set of divided image data including the image data added by said image data adding means, said first recording section and said second recording section completing recording on the same area of the recording medium.

* * * * *

UNITED STATES PATENT AND TRADEMARK OFFICE
CERTIFICATE OF CORRECTION

PATENT NO. : 6,174,039 B1
DATED : January 16, 2001
INVENTOR(S) : Miyake et al.

It is certified that error appears in the above-identified patent and that said Letters Patent is hereby corrected as shown below:

Column 2,
Line 17, "undischarge," should read -- non-discharge, -- .
Line 50, "Rowe" should read -- have -- .

Column 3,
Line 15, "complemental" should read -- complementary -- .

Column 8,
Line 33, "complemental" should read -- complementary -- .
Line 44, "th e" should read -- the -- .
Line 49, "trouble" should read -- problem -- .

Column 11,
Line 67, "as" should read -- as, --, "undischarge" should read -- non-discharge -- , and "one" should read -- ones -- .

Column 12,
Line 54, "the" should read -- sufficient -- and "enough" should be deleted.

Column 19,
Line 58, "trouble" should read -- problem -- .

Column 22,
Line 61, "in" (first occurrence) should read -- by -- .

UNITED STATES PATENT AND TRADEMARK OFFICE
CERTIFICATE OF CORRECTION

PATENT NO. : 6,174,039 B1
DATED : January 16, 2001
INVENTOR(S) : Miyake et al.

It is certified that error appears in the above-identified patent and that said Letters Patent is hereby corrected as shown below:

Column 24,
Line 13, "in" (first occurrence) should read -- by -- .

Signed and Sealed this

Twenty-seventh Day of November, 2001

*Attest:*

*Attesting Officer*

NICHOLAS P. GODICI
*Acting Director of the United States Patent and Trademark Office*